July 21, 1970　　　P. C. CONGLETON ET AL　　　3,521,227
DISPLAY SYSTEM FOR PROVIDING INTEGRATED
DISPLAY OF AIRCRAFT INFORMATION
Filed Oct. 10, 1966　　　　　　　　　　17 Sheets-Sheet 1

INVENTORS.
PAUL C. CONGLETON
HIDEKI D. IZUMI
CHARLES L. McAFEE
CHARLES K. SNYDER

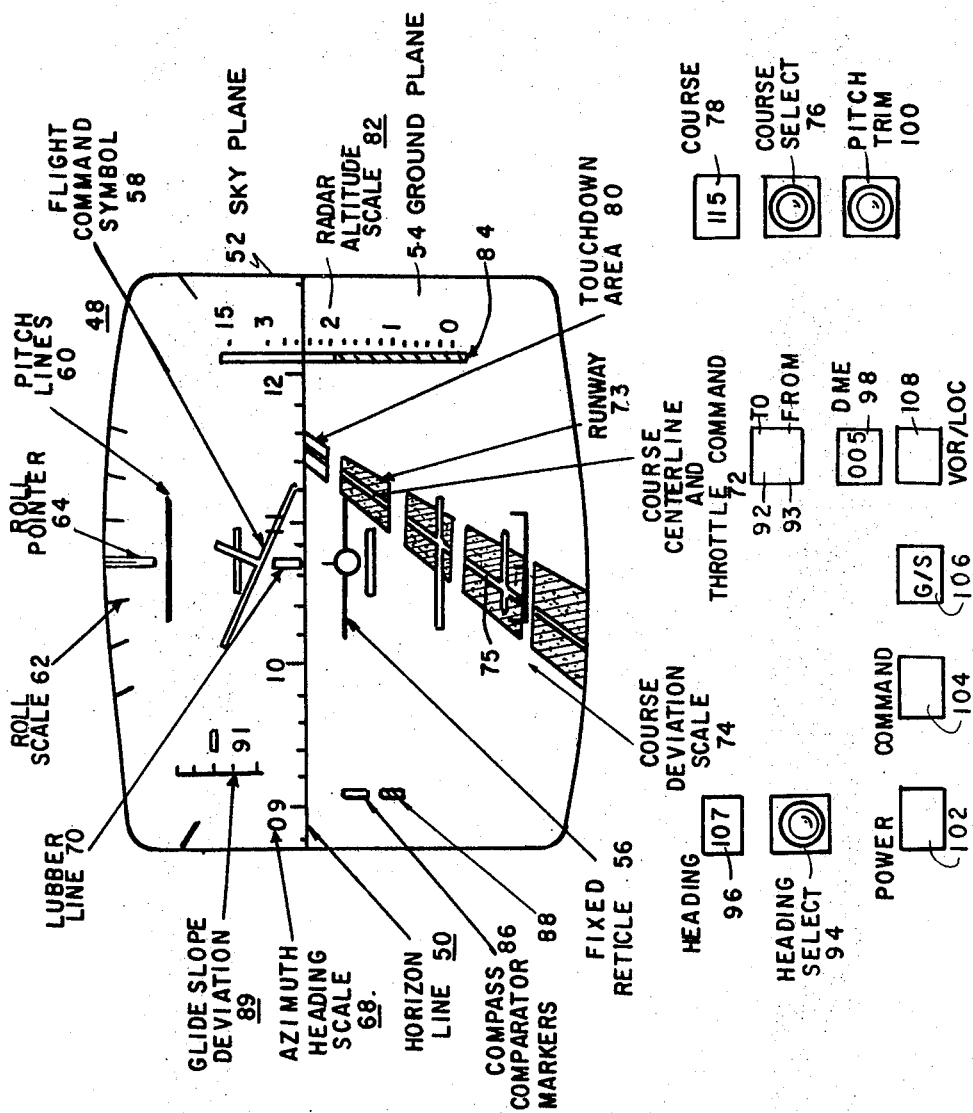

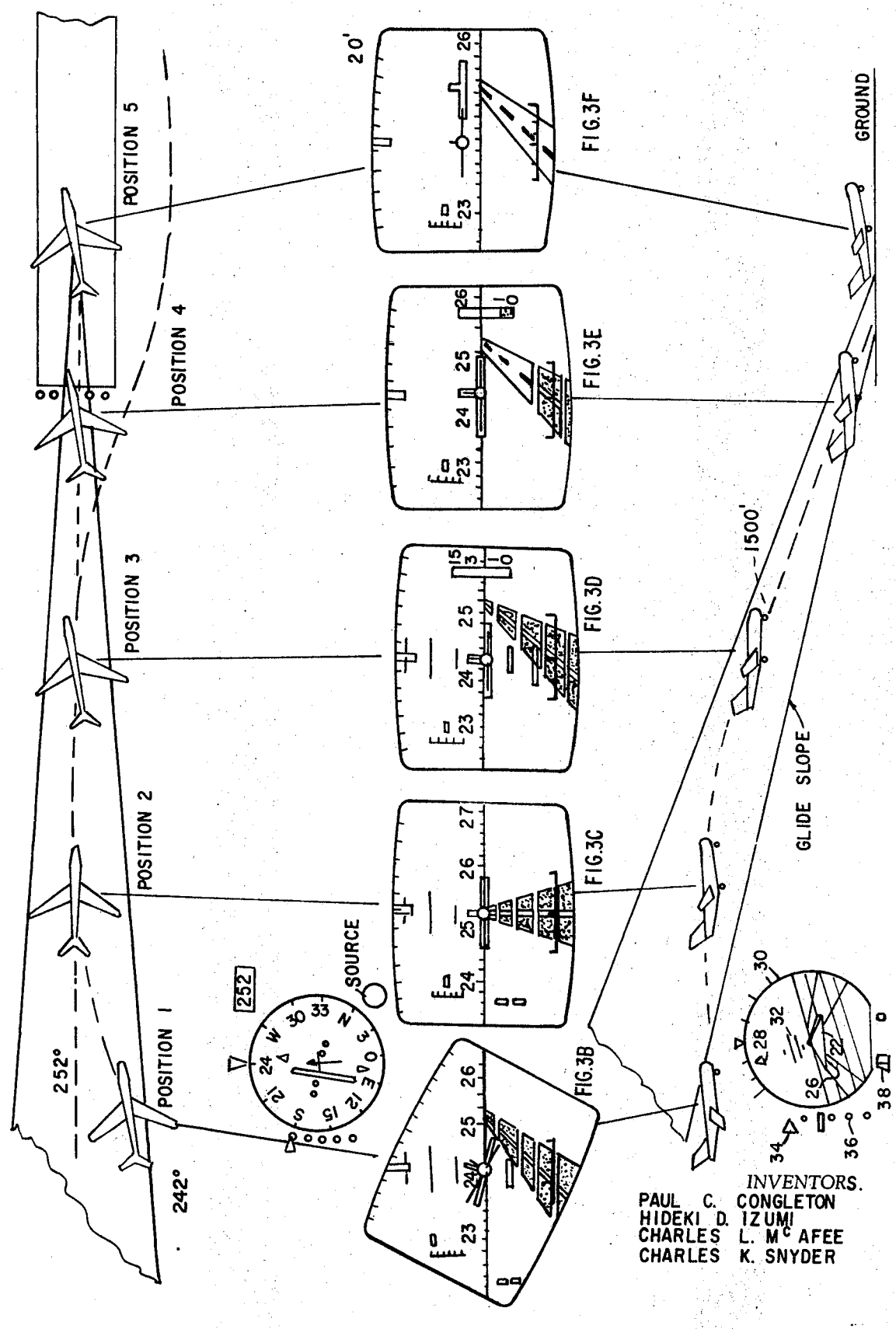

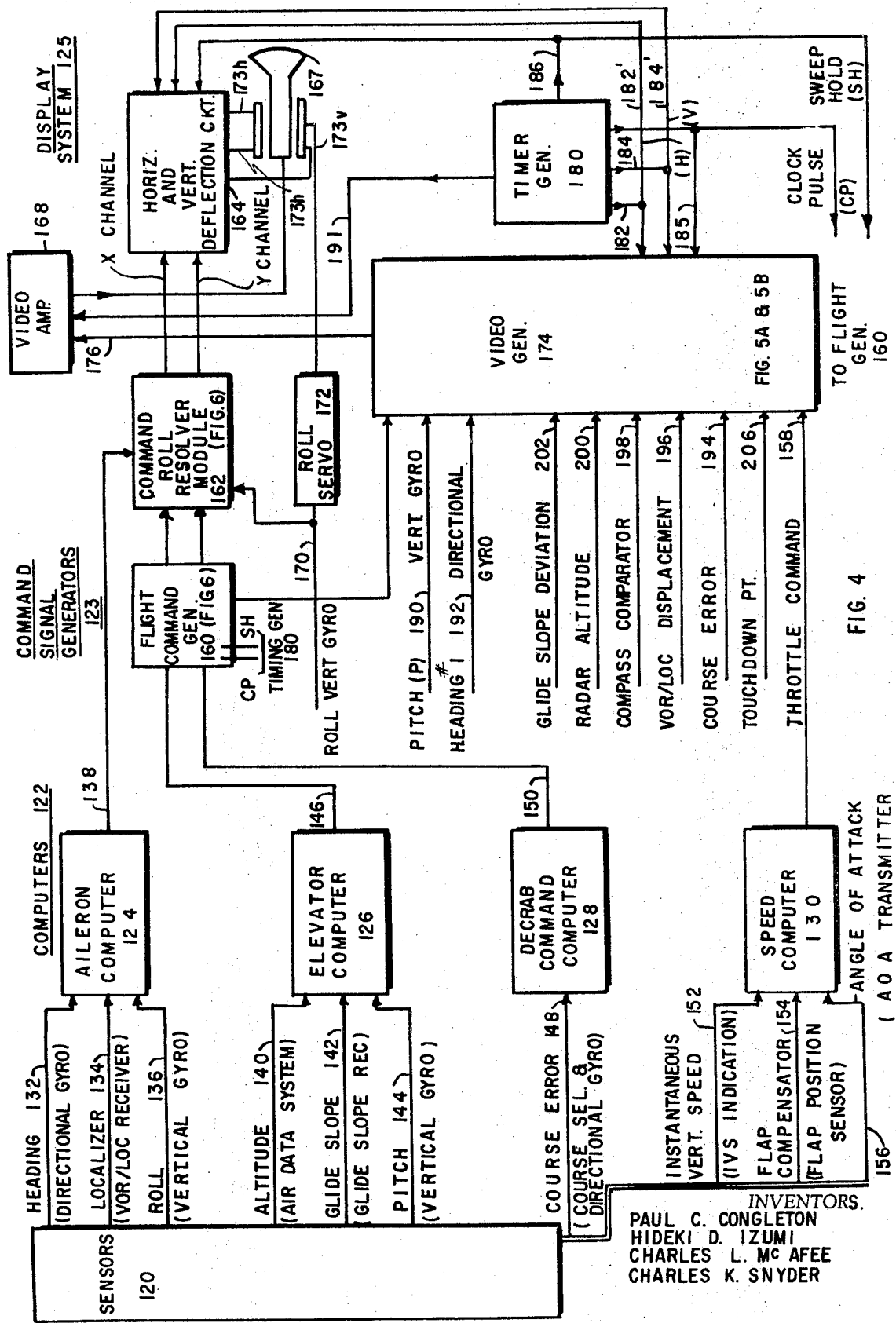

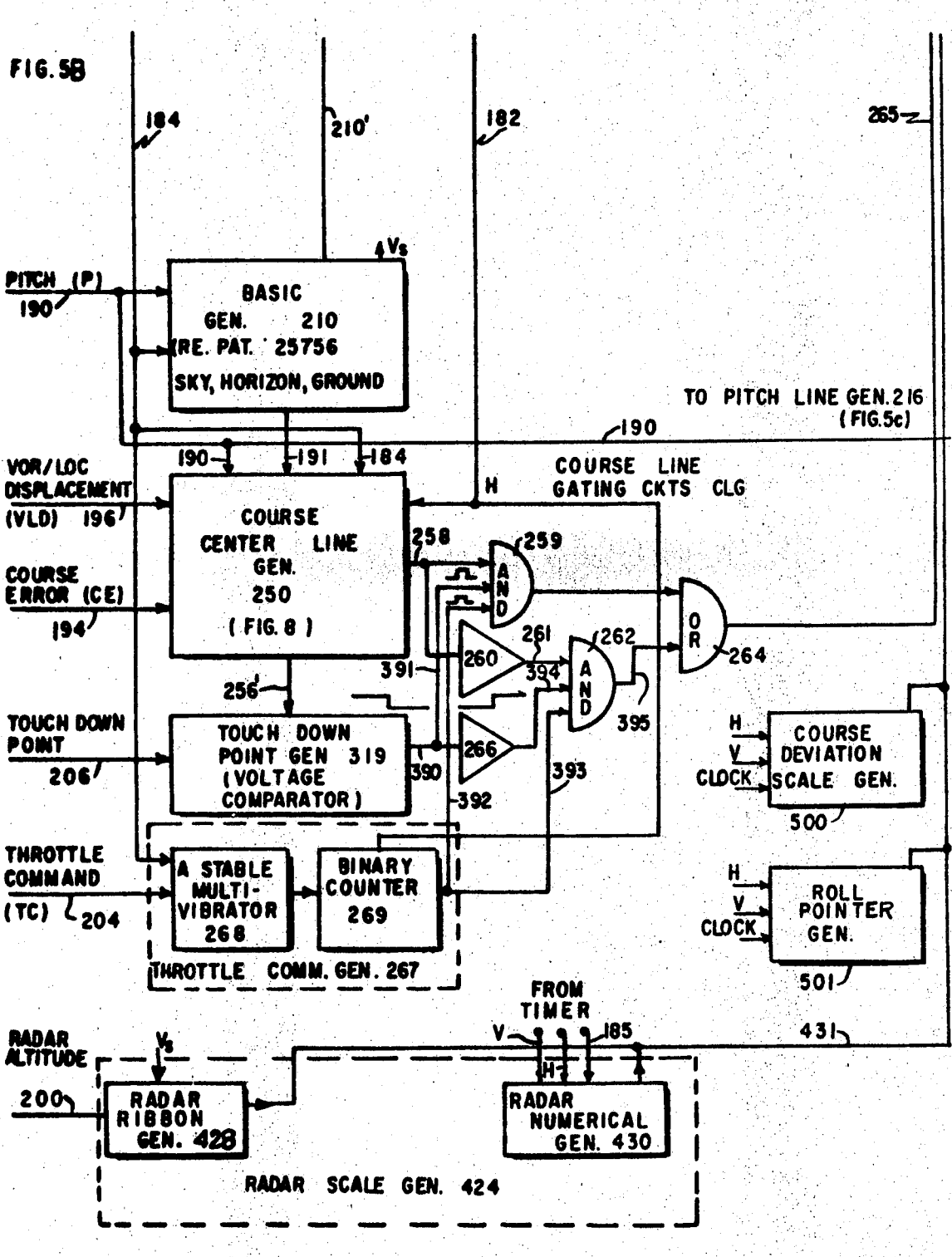

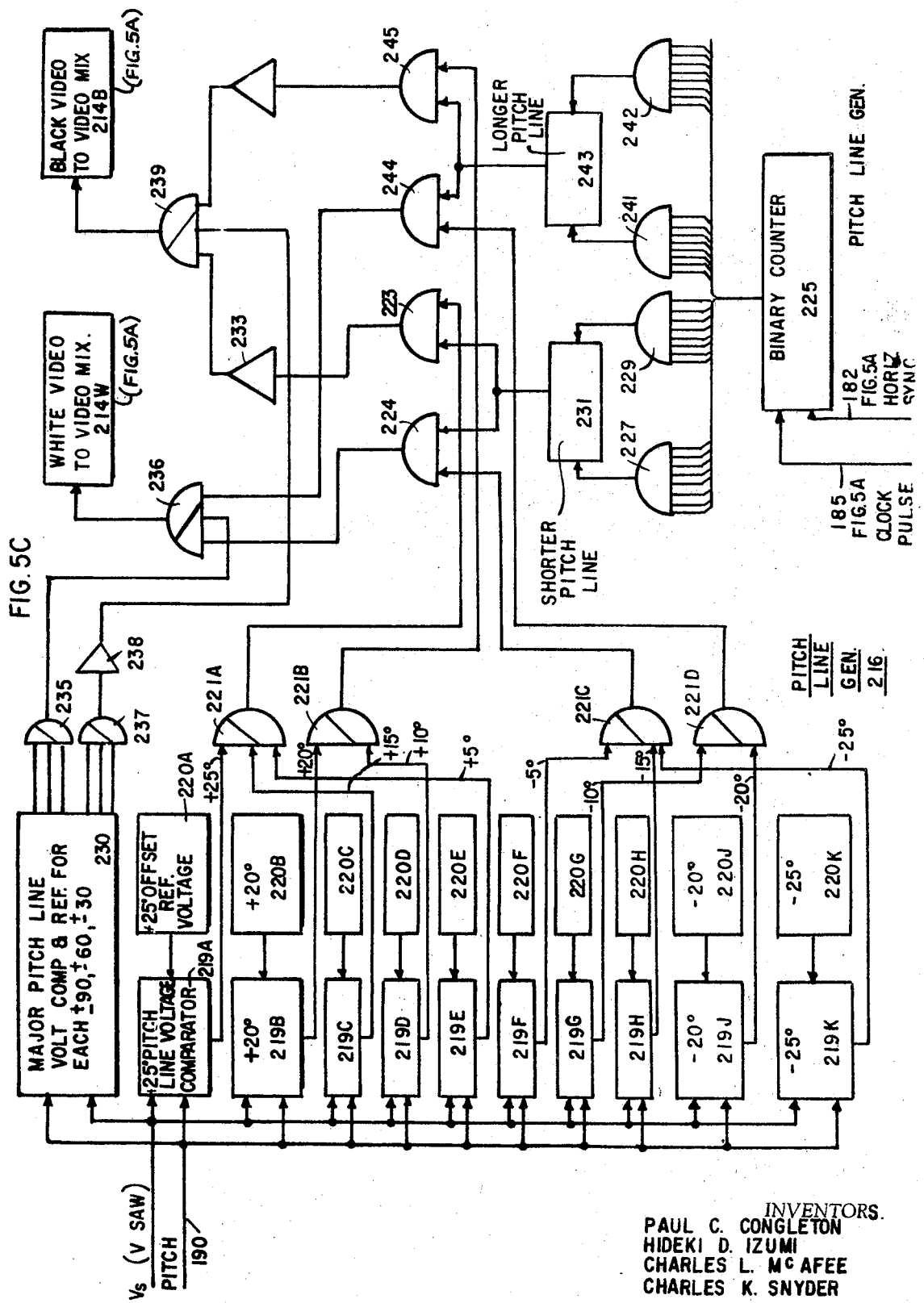

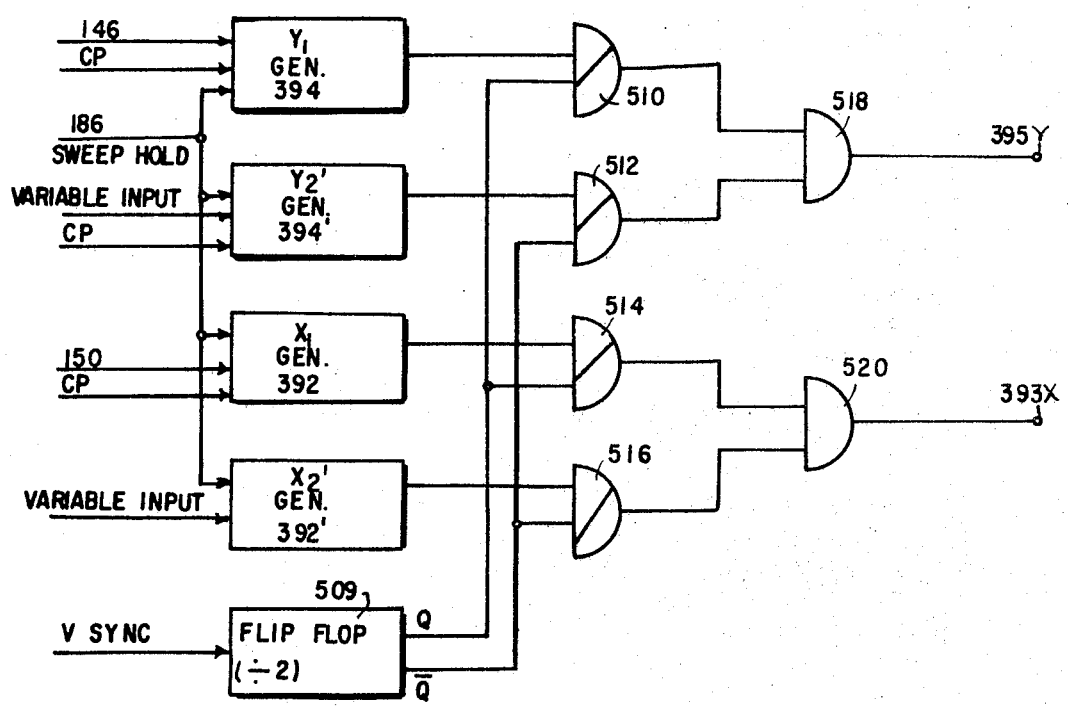
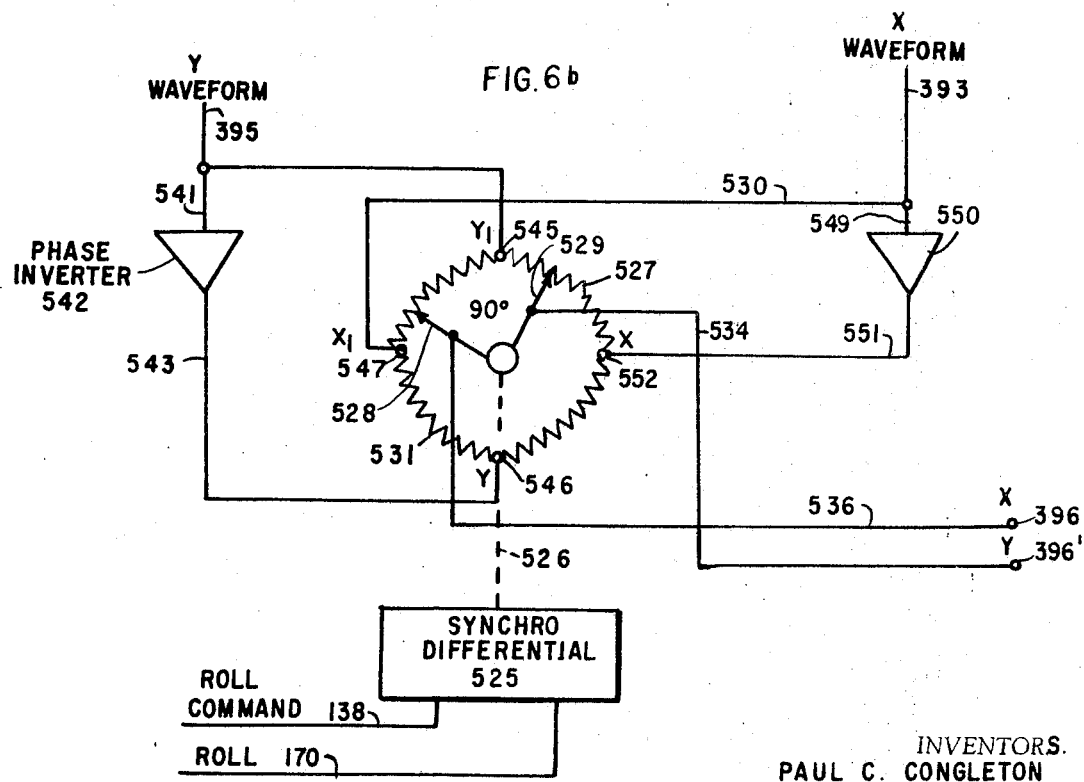

July 21, 1970     P. C. CONGLETON ET AL     3,521,227
DISPLAY SYSTEM FOR PROVIDING INTEGRATED
DISPLAY OF AIRCRAFT INFORMATION
Filed Oct. 10, 1966     17 Sheets-Sheet 10
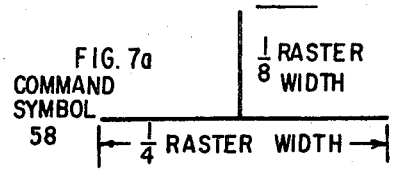
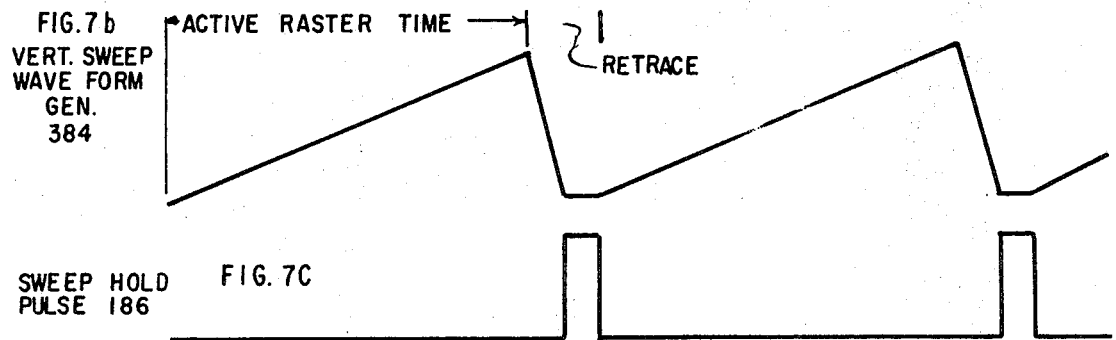
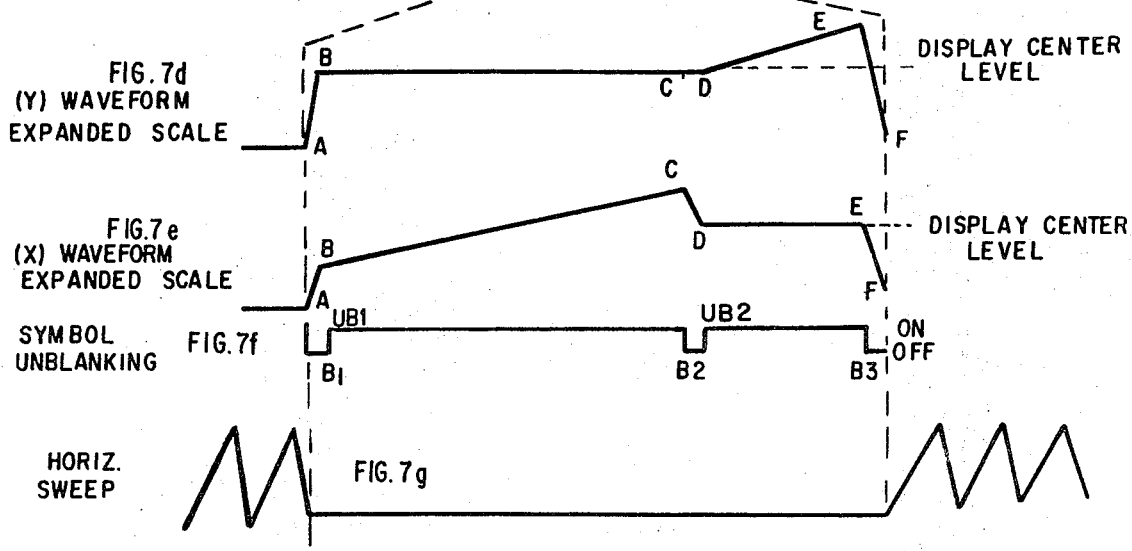
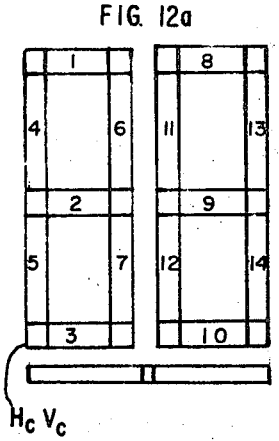
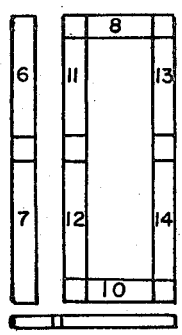
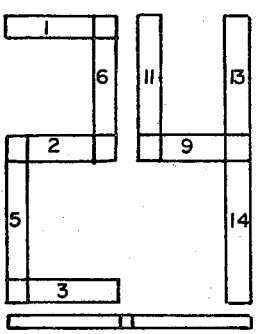
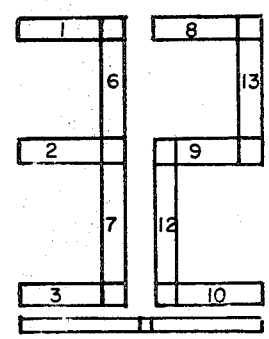
INVENTORS.
PAUL C. CONGLETON
HIDEKI D. IZUMI
CHARLES L. McAFEE
CHARLES K. SNYDER

FAR-TURN CONDITION

NEAR-TURN CONDITION

FAR-TURN AND NEAR-TURN
CONDITION

−15° PITCH-DOWN CONDITION

+15 PITCH-UP CONDITION

INVENTORS.
PAUL C. CONGLETON
HIDEKI D. IZUMI
CHARLES L. McAFEE
CHARLES K. SNYDER

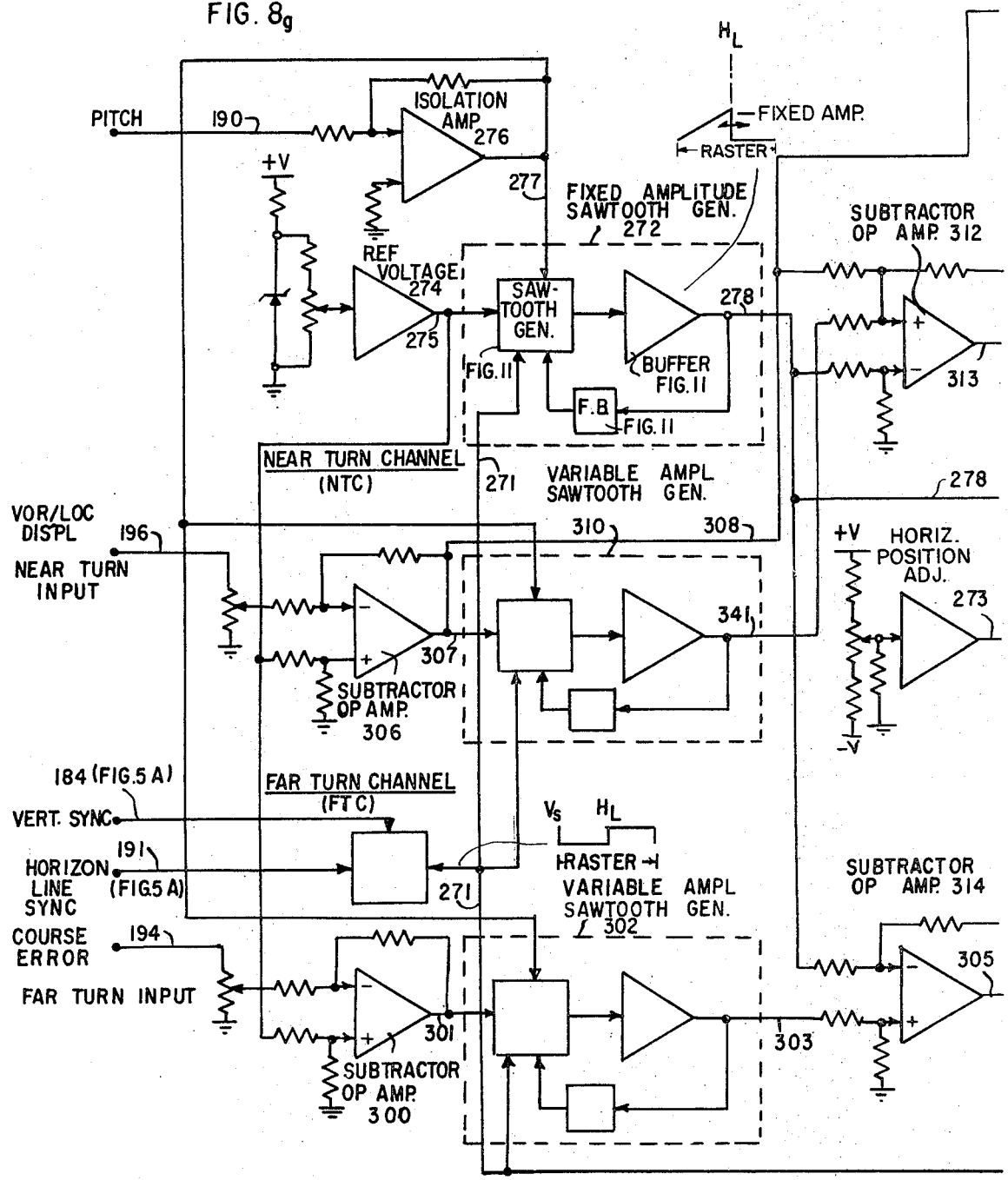

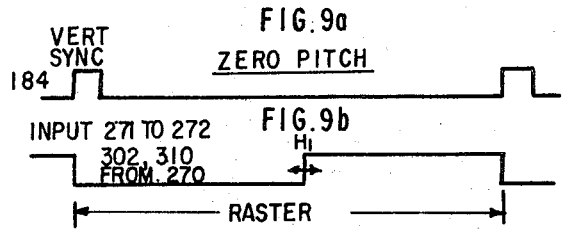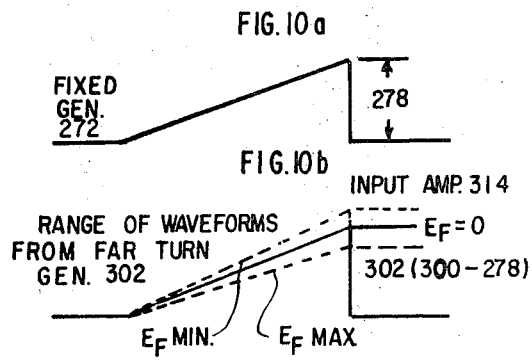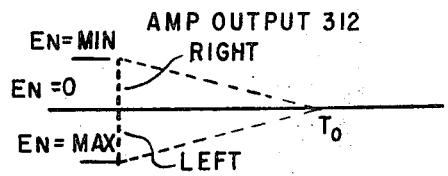
INVENTORS
PAUL C. CONGLETON
HIDEKI D. IZUMI
CHARLES L. McAFEE
CHARLES K. SNYDER

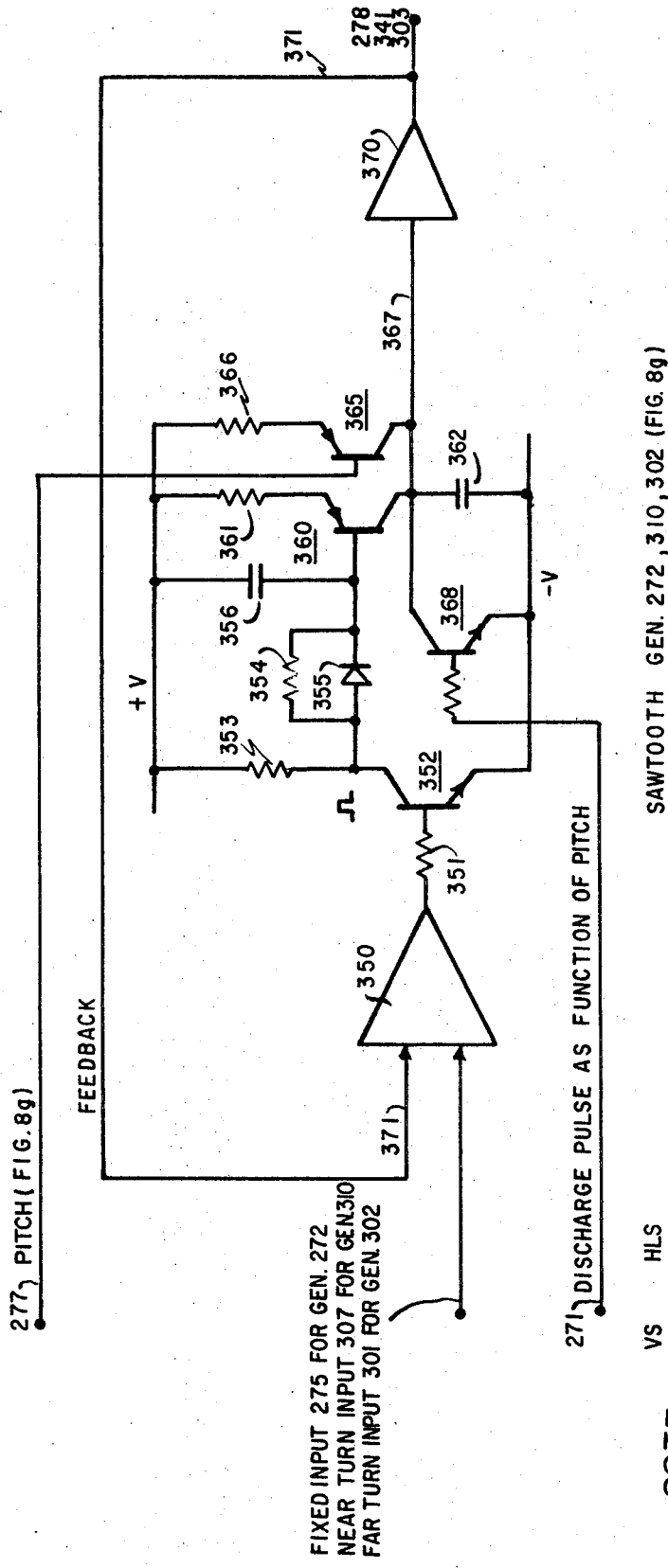
FIG. II
INVENTORS.
PAUL C. CONGLETON
HIDEKI D. IZUMI
CHARLES L. McAFEE
CHARLES K. SNYDER July 21, 1970  P. C. CONGLETON ET AL  3,521,227
DISPLAY SYSTEM FOR PROVIDING INTEGRATED
DISPLAY OF AIRCRAFT INFORMATION
Filed Oct. 10, 1966  17 Sheets-Sheet 16
| FIG. 13a<br>HORIZ.<br>SAWTOOTH | FIG. 13b<br>VERTICAL<br>SAWTOOTH | FIG. 13c<br>DISPLAY<br>PRESENTATION | |
|---|---|---|---|
| 1 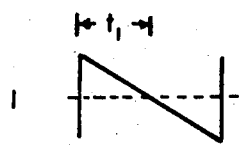 | 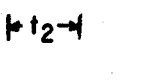 | 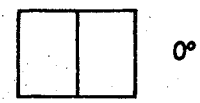 | 0° |
| 2 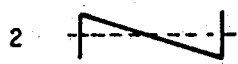 | 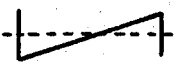 | PIVOT POINT 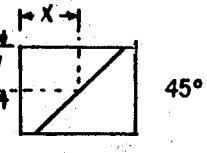 | 45° |
| 3 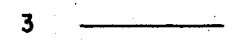 | 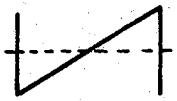 | 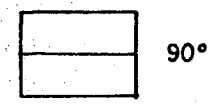 | 90° |
| 4  |  |  | 135° |
| 5 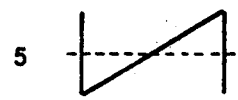 | 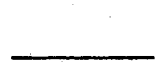 | 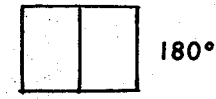 | 180° |
| 6  | 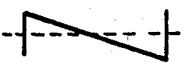 |  | 225° |
| 7  | 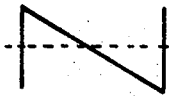 | 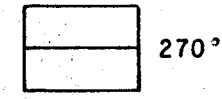 | 270° |
| 8  | 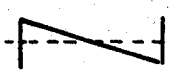 |  | 315° |
| 9 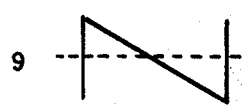 |  | 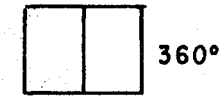 | 360° |
INVENTORS.
PAUL C. CONGLETON
HIDEKI D. IZUMI
CHARLES L. McAFEE
CHARLES K. SNYDER

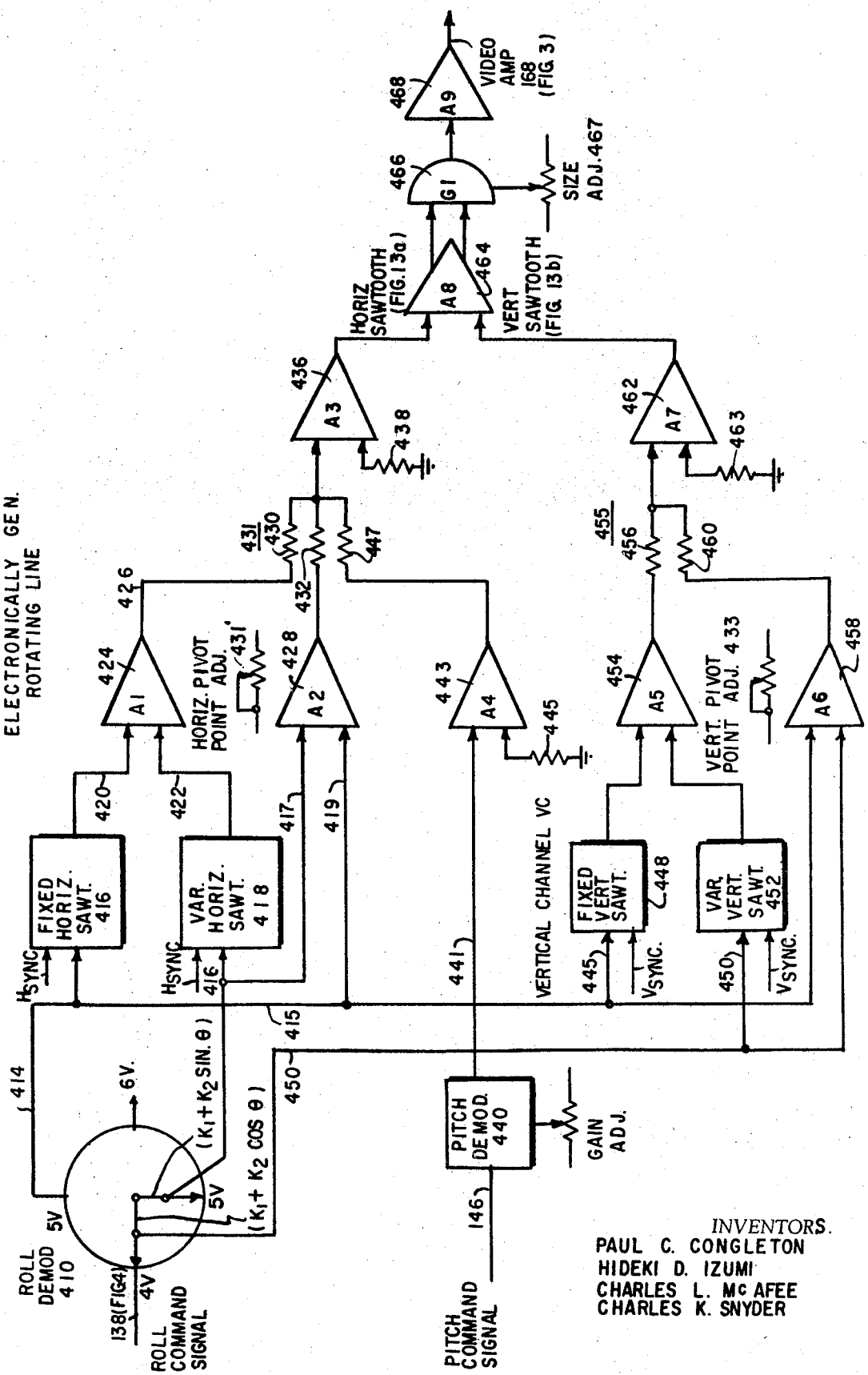

3,521,227
DISPLAY SYSTEM FOR PROVIDING INTEGRATED DISPLAY OF AIRCRAFT INFORMATION
Paul C. Congleton, Menlo Park, and Hideki D. Izumi and Charles L. McAfee, San Jose, and Charles K. Snyder, Cupertino, Calif., assignors to Kaiser Aerospace & Electronics Corporation, Oakland, Calif., a corporation of Nevada
Filed Oct. 10, 1966, Ser. No. 585,643
Int. Cl. G08g 5/02
U.S. Cl. 340—27
26 Claims

ABSTRACT OF THE DISCLOSURE

A system for displaying command information, the horizontal situation and attitude infomation of a mobile unit on a single display which electronically generates a command symbol, movable vertically, laterally and about its roll axis to indicate attitudes to be effected to achieve an optimum flight situation; and which electronically generates a line symbol to portray the displacement of an aircraft from a selected course and the difference between the heading of the aircraft and the selected course; and further provide symbols indicating actual aircraft attitudes.

---

The present invention is directed to a new and novel system for providing an integrated display of flight and navigational information to an aircraft pilot.

In the initial stages of aviation, for the most part flight was restricted to favorable weather conditions and, not infrequently, those attempting to ignore unfavorable conditions were victims of disaster. With the advance of aviation technology, the need for instruments which might enable safe flight in restricted visibility situations became more and more apparent, and continuous effort and thought were directed toward the provision of instruments and systems capable of providing such flight aids to the pilot.

The first practical system for use in "wings-level" flight without reference outside the aircraft to the real world, comprised no more than an airspeed indicator, a compass, an altimeter, an inclinometer and a rate-of-turn indicator. Though of relatively simple construction, such instruments remain today in aircraft as a backup for for the more sophisticated instruments now in use.

Progress over the years resulted in the addition, among others, of a gyro horizon instrument from which the pilot could more graphically visualize aircraft attitude in terms of pitch and bank, and a directional gyro which provided more stability than the magnetic compass. Perhaps the most significant advance occurred with the development of navigational aids, such as automatic direction finders and omni ranges, which resulted in the ability to provide a graphic representation to the pilot of aircraft position relative to a desired course. Manifestly the provision of this increased amount of information to the pilot resulted in a corresponding increase in the number of aircraft instruments which were necessarily monitored by the pilot in flight. However as the speeds of the aircraft increased, during takeoff, landing and flight, the time for instrument scan became increasingly shorter and a new problem arose.

In the early 50's an attempt was made to combine aircraft heading, omni range deviation, aircraft attitude and flight command into a single unit known as a zero reader. The device proved to be inadequate and was short lived. The art then progressed to the development of an attitude director indicator (essentially a gyro horizon with flight command in pitch and roll), and a horizontal situation indicator which is basically a compass with deviation indication for omni range, and in some instances, an automatic direction finder indicator. Such instruments are currently in use in commercial aircraft.

During the period such instruments were developed, the state of the art of aircraft and aircraft controls also advanced. By way of example, there has been an increasing amount of effort directed in recent years toward the provision of an automatic pilot system for use in the different modes of flight, including take off, navigation and landings. However, in the end, no matter how well a system is designed, it can only follow a programmed function—it is not capable of thought or command decision. Further, being a system, it is always subject to malfunction. As a result, the pilot must now monitor an even larger number of instruments and must supervise an increased number of controls in time periods of shorter duration. Thus in effect the use of automatic equipment results in pilot decision of an even more critical and serious nature.

It has been found that in the use of known instruments a barrier comprised of the scan rate of the pilot in reading the information time required to integrate the information obtained in readout is being reached. That is, critical changes occur so quickly in the flight situations of modern aircraft that the three to five seconds required to establish the instrument scan are not always available. A quick look at the runway or some physical distraction, such as a sneeze, could result in a crisis during the critical period.

There is therefore a need for, and it is an object of the present invention to provide, a display which is operative to provide a visual presentation of the basic information requirements to the pilot for various modes of flight in a manner which requires a minimum of scan time.

In order for the pilot to properly evaluate the performance of the automatic system now in use, it is necessary to provide accurate information to the pilot relating to the actual attitude of the aircraft about its several axes, command information indicating the attitudes to be effected to achieve the optimum flight situation, and information setting forth the "horizontal situation" of the aircraft. Attitude information, for example, may include the pitch, bank, and heading of the aircraft. Horizontal situation information, as the name implies, includes a display of the relative displacement of the aircraft from the selected course and the relationship of the course to the aircraft. Command information identifies the flight attitudes to be executed to reach the optimum flight condition. While reference is made to aircraft in the following objects by way of example it will be apparent that other mobile units such as submarines, tanks and the like will find like use for such display unit.

It is a specific object of the invention to provide a novel system which provides a display of information relating to the aircraft attitude including roll, pitch, and yaw as integrated in a display with horizontal situation information and command information indicating the attitudes required to achieve the desired flight condition. The command attitude information and actual attitude information are referenced to one another to simplify both execution and decision by the pilot.

It is yet another object of the invention to provide means for providing a first set of attitude and horizontal situation information cues on a display including a first means for effecting roll of such set with displacement of the aircraft about its roll axis, and means for providing a second set of command information cues on the same display including means for effecting independent roll of the second set in response to input command signals.

It is a further object of the invention to provide an integrated display including means for providing information relating to the horizontal situation of the aircraft relative to a selected course on the display, and command attitudes in terms of pitch, roll and yaw changes required to achieve the desired optimum flight condition for such situation.

It is an additional object of the present invention to provide an integrated display including means for providing a plurality of symbols identifying different courses, means for providing information relating to the horizontal situation of the aircraft relative to a selected course, and means for providing information relating to the actual attitude of the aircraft for use therewith.

It is yet another object of the invention to provide information on a display which includes means for providing a horizon line, means for providing a numeric heading scale on the horizon and means for indicating the actual aircraft heading along with aircraft selected heading on the numeric heading scale.

It is a further object of the present invention to provide novel means for displaying horizontal situation information for the aircraft and a flight command symbol for dictating command attitudes for the aircraft relative to a reference symbol which displays the actual attitudes of the aircraft including means for providing a flight command symbol which may be displaced laterally, horizontally and banked to provide the desired command, in all three flight axes.

It is a specific object of the invention to provide an arrangement of such type which includes means for banking the command symbol for roll commands, moving the symbol vertically for pitch commands, and moving the symbol horizontally for yaw command.

It is a further object of the invention to provide command information for use by the pilot in flying the aircraft relative to a given course and a novel horizontal situation display of the aircraft relative to the course including a fixed symbol and a course line which extends from the horizon to the bottom of the display, the position of the far end of the line being determined by aircraft course error and the position of the near end of the line being determined by the displacement of the aircraft from the selected course, and the position being adjusted relative to the fixed symbol to continuously depict the real world position of the aircraft relative to the selected course.

It is an additional object of the invention to provide a device which provides command information and a display of an approach by a mobile unit to a selected reference point, and specifically to means for providing a display for an aircraft which includes a touchdown area which issues from a horizon line as the aircraft approaches the touchdown point on the runway, and which moves toward the bottom of the presentation as the aircraft draws nearer to such point and means for providing command symbols for directing the pilot in the maneuvering of the aircraft relative to said touchdown area.

It is still a further object of the invention to provide means for generating additional integrated displays in said type presentation including glide slope information, altitude information, throttle command information, compass comparator information, pitch line information, roll pointer information and others.

The foregoing objects and features of the invention, and those which are believed to be new and novel in the art are set forth in the following specification, claims and drawings in which FIGS. 1 and 2 are illustrations of prior art devices of the type now in use in commercial aircraft;

FIGS. 3A–3F are illustrations of typical displays provided by the novel system of the present invention including reference to the actual horizontal situation and aircraft attitudes for such displays, and the nature of the showing on the prior art devices for the same flight condition;

FIG. 4 is a block diagram of the system;

Figure 5A:
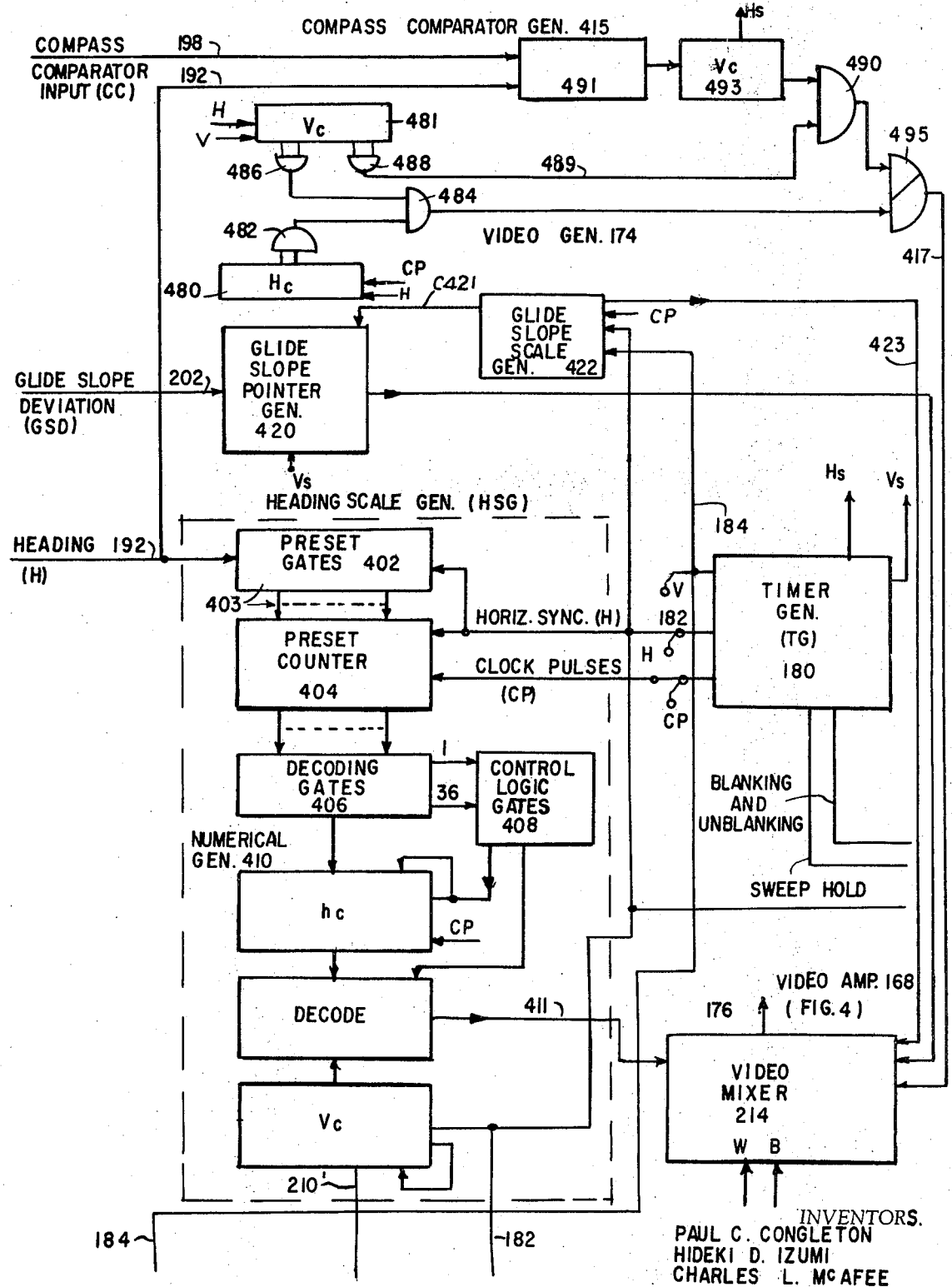
Figure 6:
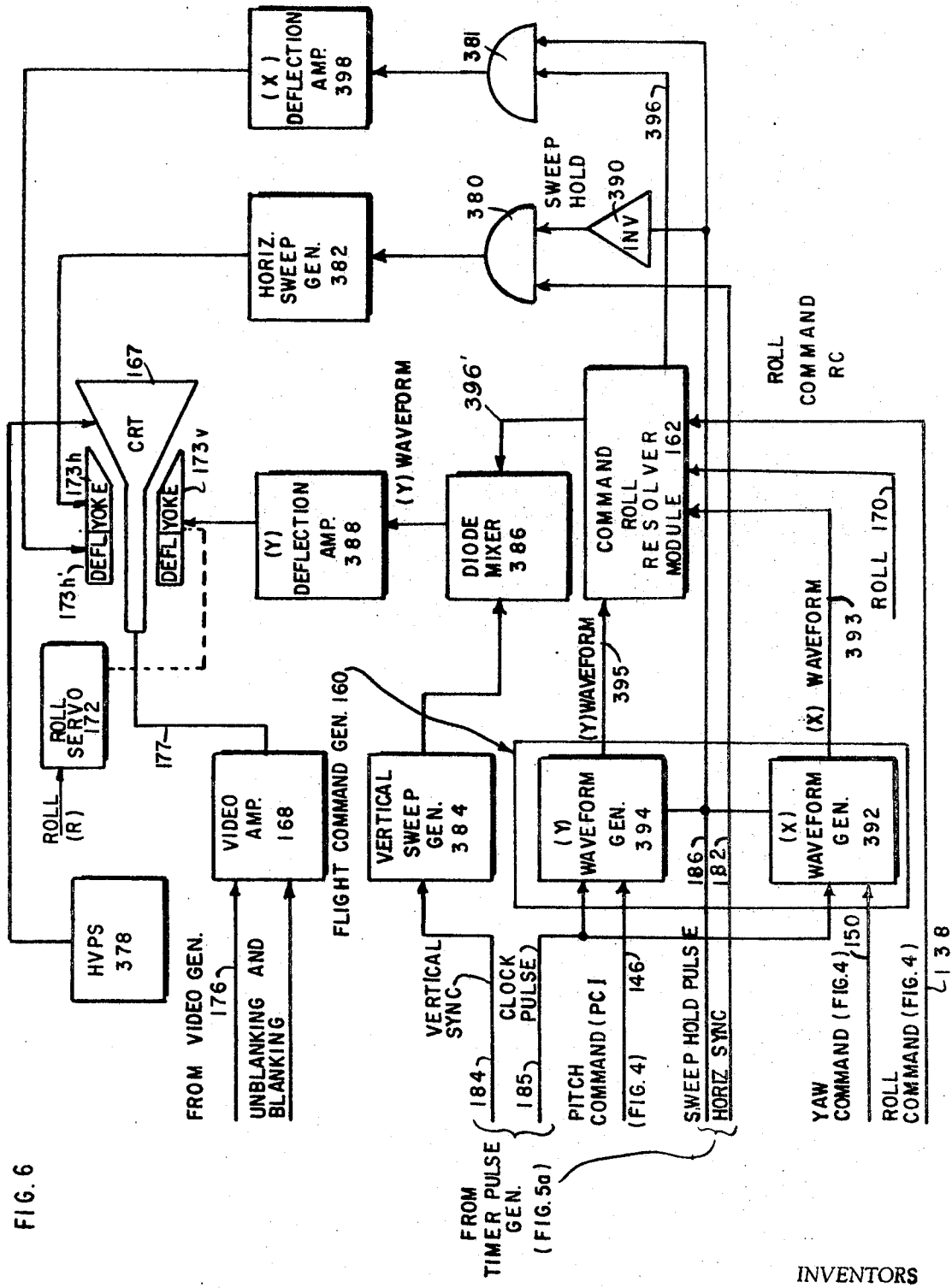
Figure 8A:
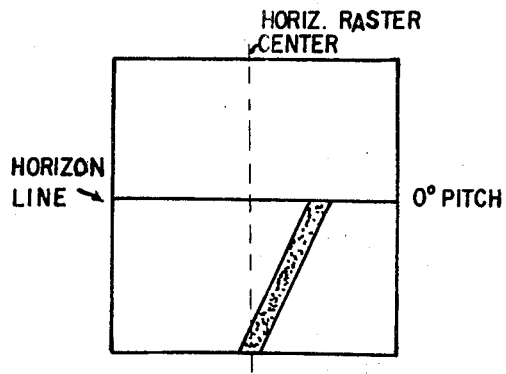
Figure 8B:
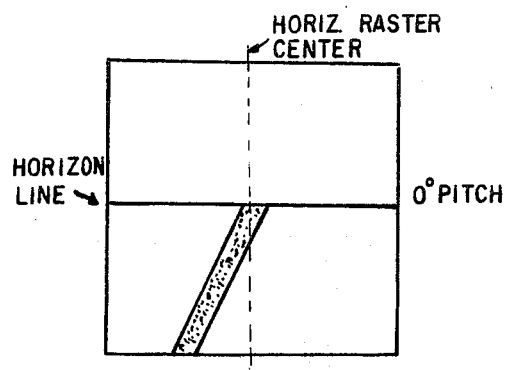
Figure 8C:
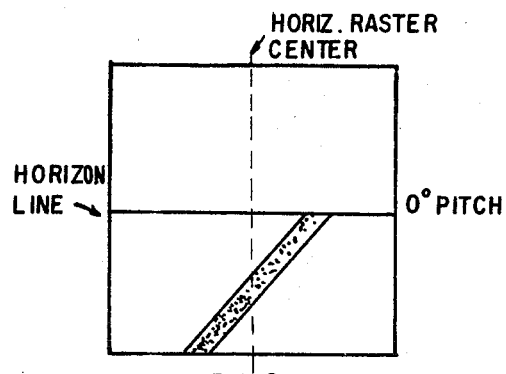
Figure 8D:
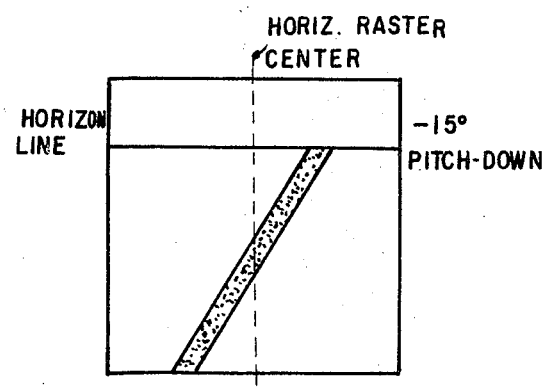
Figure 8E:
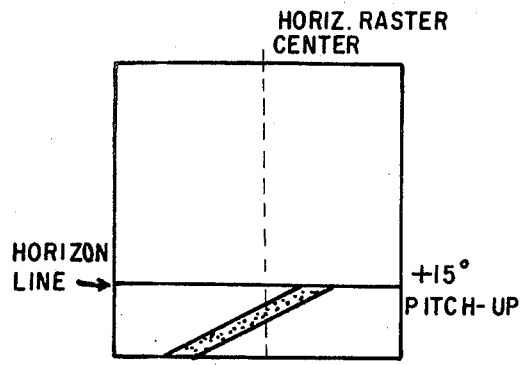
Figure 8F:
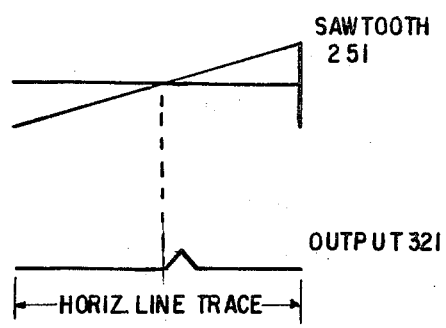
Figure 8H:
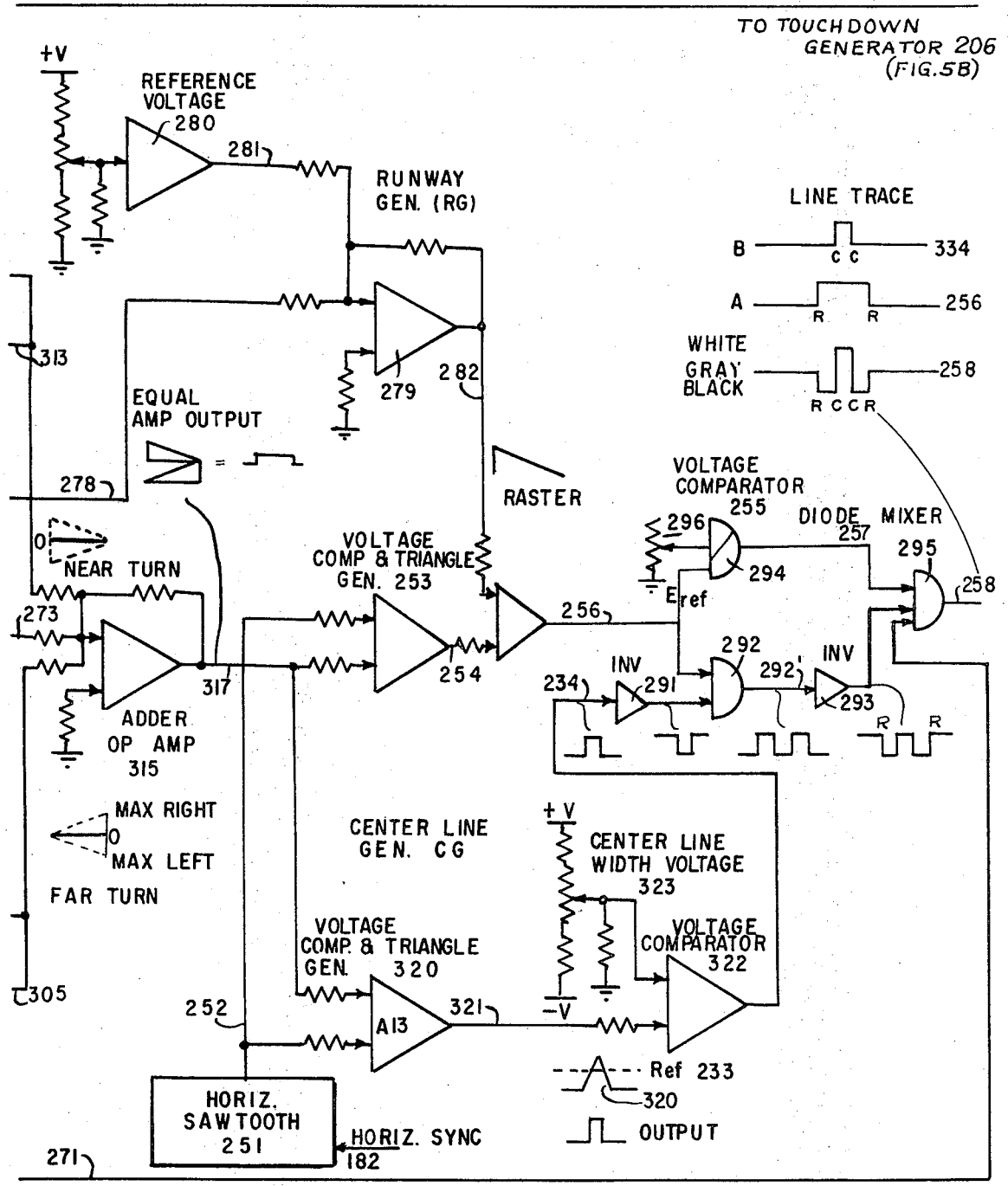

FIGS. 5A, 5B, 5C set forth in more detail the video generator circuitry (shown in block in FIG. 4), for providing the display waveforms other than the flight command symbol;

FIG. 6 sets forth the circuitry for generating the flight command symbol and the means for effecting roll and displacement thereof in a plurality of directions independent of the information provided by the video generator of FIGS. 5A–5C;

FIG. 6a sets forth the circuitry for generating different symbols in successive raster traces;

FIG. 6b sets forth details of the command roll resolver module of FIG. 6;

FIGS. 7a–7g illustrate the waveforms provided by the circuitry of FIG. 6;

FIGS. 8a–8e illustrate typical displays which must be generated for different conditions of flight;

FIG. 8f illustrates waveforms provided in the course line generator;

FIGS. 8g, 8h illustrate the course line generator circuitry;

FIGS. 9a–9j, 10a–10f illustrate further waveforms generated by the course line generator for different conditions of flight;

FIG. 11 illustrates a sawtooth generator for use in the courseline generator circuitry of FIGS. 8g, 8h;

FIGS. 12a–12d illustrate examples by numeric generation for the heading display;

FIGS. 13a, b, c illustrate waveforms and resultant displays achieved with the circuitry of FIG. 14; and FIG. 14 illustrates the circuitry for providing the waveforms and displays of FIGS. 13a, b, c.

PRIOR ART

In a number of commercial aircraft now used in the field, several different mechanical indicators are used to provide the pilot with information concerning horizontal situation, i.e., the position of the aircraft relative to a selected course, along with command information which indicates the required maneuvering of the aircraft to arrive at and maintain flight along the selected course. The pilot integrates the information obtained from such instruments and mentally determines the action which may be required.

Figure 1:
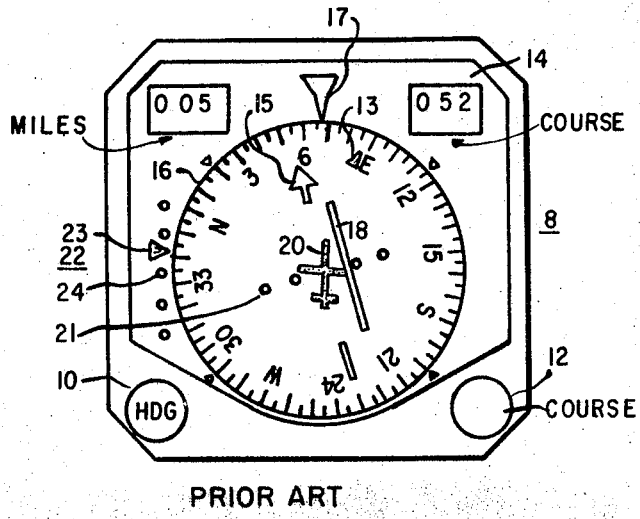
Figure 2:
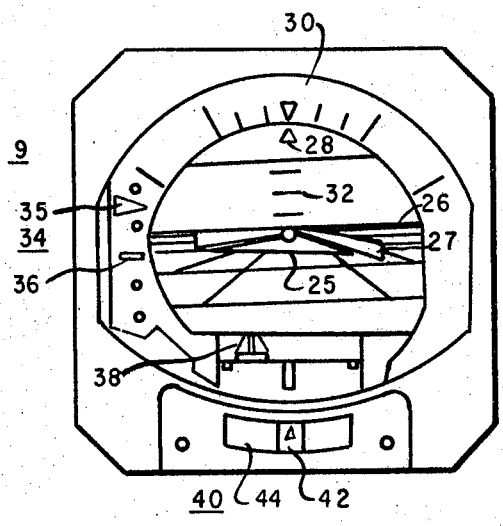

The more important ones of these mechanical instruments comprise a horizontal situation indicator 8, such as shown in FIG. 1, and a flight director 9, such as shown in FIG. 2. The primary functions of the horizontal situation indicator 8 (FIG. 1) are to provide heading select, course select and course deviation information for use by the pilot in interpreting the position of the aircraft relative to a selected path. The flight director 9 provides the actual pitch and bank attitudes of the aircraft for comparison with the command information from the aircraft computer so that the pilot can maneuver the aircraft in the manner determined by the computer as necessary to reach the desired path.

With reference to FIG. 1, the course indicator includes a heading control knob 10 at the lower left corner which controls rotation of the heading marker 13. A course control knob 12 located at the lower right corner is adjusted by the pilot to rotate the course arrow 15, and thereby select the VOR radial to be flown (course line 052 in the illustrated example). A course counter 14 in the upper right hand corner provides a digital readout of the selected course (052), and the arrow 15 inside the azimuth circle 16 provides the same information in a horizontal situation presentation. The center segment 18 of the course arrow 15, which portion is known as a lateral direction bar, is movable laterally with displacement of the aircraft from a selected course. A fixed aircraft symbol 20 located in the center of the course indicator 8 displays the aircraft position in relation to the selected course.

As will be discussed in more detail hereinafter equipment well known in the art automatically provides a course error signal to the system from a VOR radio or localizer equipment. Thus in a cross-country flight, a VOR frequency will be selected to reach a desired navigational fix near the desired airport and dialled into the system. Deviations of the aircraft from the course are fed into the system with resultant displays on the instruments of FIGS. 1 and 2 which indicate the nature of the deviation and the action to be taken. When the final navigational fix is reached, a localizer course is selected by adjusting the course select knob 12 to select a desired approach to the airport. In the illustration of FIG. 1, the pilot selected a course 052. The digital readout counter 14 in the upper right hand corner of the display was thereby adjusted to the selected course 052 and the course arrow 15 was adjusted toward the corresponding heading on azimuth circle 16.

Assuming that the showing in FIG. 1 is a display which is provided after selection of a localizer course in an approach to an airport, it will be apparent that the miniature aircraft 20 (which represents the position of the aircraft with respect to the selected course as indicated by bar 18) is to the left of the selected course 052 and is on heading 063 so as to intercept the selected course 052. The deviation scale 21 comprising the line of dots extending through the aircraft symbol 20 indicates the extent of deviation from the selected course, each dot representing approximately 5° deviation. In FIG. 1, the deviation is in the order of 5°.

In addition to directing the pilot to the desired course during the approach to the airport, the glide slope indicator 22 including pointer 23 and scale 24 at the left hand side indicates the extent of deviation of the aircraft vertically from the glide slope, and the pilot adjusts his controls to maintain the aircraft position relative to the glide slope as shown in FIG. 1. Thus it will be seen that the information provided by course indicator 8 (other than the glide slope indication) is aptly termed "horizontal situation" information.

The flight director 9 of FIG. 2 continually provides the pilot with information concerning the actual roll and pitch attitudes of the aircraft as well as director information indicating the change in aircraft attitude necessary to maintain the aircraft on a selected course.

As shown in FIG. 2, the flight director instrument 9 basically includes a fixed delta shaped symbol 25 located in the center of the flight director window. The fixed symbol 25 serves as a reference for the aircraft attitudes when related to a horizon 26, and inverted V command bars 27. The roll attitude of the aircraft, for example, is shown by rotation of the horizon bar 26 relative to the symbolic symbol 27, 0° to 360° roll presentation being provided as required. An angular display of bank angle is provided by a bank angle pointer 28 and scale 30 located near the top of the instrument, the bank angle scale being marked at 10, 20, 30 and 60 degree positions. The pitch attitude is shown by the vertical position of the pitch markers 32 relative to the fixed aircraft symbol 25, the pitch attitude marks extending upwardly from the horizon 26 at 5° increments to 20°.

In flight, the command bars 27 are banked to display the commands necessary to maintain the aircraft in flight along a selected heading or radio course, and are adjusted vertically to display pitch commands necessary to return the aircraft to the glide slope or a seletced altitude. The pilot in responding to the commands maneuvers the aircraft so that the aircraft symbol 25 is aligned with the command bars 27, and in consequence the aircraft will be flown along the desired path. In the particular illustration of FIG. 2, the command bars 27 have been displaced approximately 3° as a result of information provided by the computers for the purpose of bringing the aircraft to a selected heading, and the pilot has maneuvered the aircraft represented by delta symbol 25 to the command being provided by the command bars 27 by banking to the right approximately 3°.

The glide slope indicator 34 includes pointer 35 which is adjustable along scale 36 and is operable only when the navigation receiver is tuned to a localizer frequency. In such mode, the indicator 34 displays the vertical deviation of the aircraft from the beam center.

The instrument also includes a runway symbol 38 which represents the center of the localizer beam, and is in view when the navigation receiver is tuned to a localizer frequency. The outside marks on the scale represent 1¼ degrees displacement from localizer beam center. Such presentation is for the purpose of displaying displacement information only—the roll command is displayed by the command bars 27. A slip indicator 40 which consists of a weighted ball 42 and a liquid filled tube 44 monitors aircraft slip and turn in the well known manner.

As an illustrative example, it will be assumed the aircraft has arrived at its final navigational fix after a cross country flight, and is flying a holding pattern. The FI (flight instrument) mode is selected by a mode control switch (not shown) and the course arrow 15 is set to the published inbound localizer course (assumed to be 052 in this example) by adjustment of the course select knob 12. The navigation receiver (not shown) is tuned to the localizer frequency. As the vector headings are received from the airport controller, the heading bug course selector 13 is set to the corresponding point on the azimuth circle 16 by adjustment of the heading selector knob 10. As "let-down" instructions are received from the airport controller, the altitude hold function (not shown) is disengaged, and the rate of descent is established by setting the pitch command control to provide control of the command bars 27 in accomplishment of descent at the desired rate. When cleared for approach the mode selector (not shown) is switched to VOR/LOC, and thereafter the pilot maintains the aircraft symbol 25 aligned with the command bars 27 and the aircraft will be let down along the ILS localizer and the proper glide slope. During the approach, compensation is automatically made for any cross wind, and the crab angle established by the system is shown by the relationship of the course arrow 15 to the lubber line 17 (FIG. 1).

It is apparent from the foregoing description that during crucial periods of the landing, the pilot is required to absorb information from both the flight, director indicator and the horizontal situation indicator and to mentally integrate the information which is there provided to achieve proper landing of the aircraft.

DISPLAY INFORMATION PROVIDED
BY DISPLAY DEVICE

With reference now to FIG. 3a, the display presentation provided according to the novel concepts of the present invention are shown thereat. The information content of the display unit which is intended to replace both the course indicator 8 and flight director 9 provides information including both electronically generated symbology which is displayed on the face of the cathode ray tube as well as discrete information in the form of numerical readouts to thereby provide a more flexible system capable of providing a substantially increased amount of information in a single display which is more nearly related to the real world.

The basic display 48 is shown in FIG. 3a. As there shown, the representation 48 includes a distinct horizon line 50, a sky plane 52, and a ground plane 54 which is shaded to simulate depth perspective. (The ground shading has not been shown in the drawings because of the difficulties involved in including such showing.) Superimposed upon the basic background 50, 52, 54, are information cues which may be basically categorized as attitude displacement and command information. More specifically, as shown in FIG. 3a, a fixed reference reticle or symbol 56 located in the approximate center of the display provides a fixed reference marking for the aircraft's horizontal and vertical axis. The aircraft reference 56 is comparable in size and shape with a flight command symbol 58 which will be described more fully hereinafter.

The display 48 further includes reference pitch lines 60 which will be generated through an elevation angle of plus-minus sixty degrees. Major pitch lines which also function as a horizontal reference will appear at plus-minus thirty degrees and plus-minus sixty degrees and will be coded to provide positive identification. Incremental pitch lines are provided at 5° and 10° in order to enhance pilot recognition of pitch up or pitch down attitude, the lines below the horizontal being white and the pitch lines above the horizon being black.

Movement or displacement of the aircraft about its roll axes is indicated on the display by means of a roll scale 62 in conjunction with a roll pointer 64, the roll pointer 64 enabling the pilot to ascertain in actual degrees the amount of displacement of the aircraft about the roll axes. The indication of rotation displacement of the aircraft about its roll axes is also provided by rotation of the horizon line 50 with reference to the fixed aircraft reticle 56, such displacement providing an indication and approximation of the degree of roll without the preciseness achieved by the roll scale and pointer.

It will be recognized from the foregoing description that the attitude representation provided by the sky, horizon, ground portions 52, 50, 54, the pitch information provided by pitch lines 60, the roll information provided by the roll scale 62 and pointer 64, all of which are viewed with reference to a fixed reticle 56, comprise the information presented by the electromechanical flight director 9 shown in FIG. 2. The command information normally presented by the flight director 9 by means of command bars 27 appears in the present display as a flight command symbol 58 which comprises a bright white inverted T which is utilized to present roll, pitch and yaw commands. The command is indicated by the positioning of the flight command symbol in the required roll, pitch or yaw attitudes independent of the remainder of the display. The pilot upon viewing movement of the command must respond by flying the fixed aircraft symbol 56 in such manner as to superimpose the symbol 56 upon the flight command symbol 58.

The flight command symbol is capable of showing 360 degrees of roll command. The pitch and yaw commands are constrained such that the command symbol will always remain within the viewing window. The pitch command will be limited to plus and minus ten degrees from existing aircraft pitch angle, and the yaw command range will be limited to plus and minus ten degrees from existing aircraft headings. Pitch or yaw commands in excess of this range will cause the symbol to move to maximum position of displacement and remain there until the command response reduces the error.

Heading and displacement information, such as glide slope deviation, course deviation, and the like, which are presented by the course indicator 8 (FIG. 1) in prior art systems are also included on display 48 as will now be set forth.

The azimuth heading which is provided by the azimuth card 16 (FIG. 1) on the mechanical unit 8, is presented in display 48 as a moving tape 68 which extends along the horizon line 50, the digital representation which appears at the vertical lubber mark 70 serving as a reference for instantaneous aircraft heading. Turning of the aircraft or "change in aircraft heading" results in displacement of the tape along the horizon to bring corresponding different numerals into view. The numerals are presented at ten degree intervals, the ten-degree intervals in turn being subdivided by index marks at two-degree intervals.

Horizontal situation information is also achieved by a course centerline 72 which provides a representation of the aircraft instantaneous displacement from a localizer course or a selected VOR radial and is presented in the display 48 as a dashed white line 72 which extends from the bottom of the display to the horizon 50.

The near end of the course centerline 72 represents course deviation from the VOR/LOC beam, the degree of which is indicated by a calibrated scale 74 at the lower edge of the display. The electronically-generated scale 74 at the bottom of the display screen when utilizing ILS has a full scale range of plus-minus 2.5 degrees with incremental marks every 1.25 degrees. The position of the far end of the course centerline 72 is determined by the course dialed into the system by the course select knob 76 (which is similar to knob 12, FIG. 1), the range of movement of the far end of the course centerline being limited to plus-minus 15 degrees from the aircraft heading.

The course centerline 72 also provides command throttle to the pilot, movement of the centerline dashed blocks 75 being effected toward the bottom of the display to indicate decreased throttle and toward the horizon line to indicate increased throttle. Thus, in responding the pilot moves the throttle in the same direction as the motion of the symbology. As the throttle is moved to the proper position, movement of the blocks 75 will terminate.

It will be seen from the foregoing description that the information previously provided by the horizontal situation indicator 8 and flight director indicator 9 is now included in an integrated display in a less confusing pattern which has a closer relation to the real world. In addition, display 48 further incorporates a three dimensional perspective presentation which is not achievable by indications on a dial indicator, and includes a centerline which is displaced at both the far and near ends to provide two different sets of information (i.e., as compared to the lateral deviation only of bar 18 in the mechanical unit 8).

The display further incorporates a touchdown area which initially appears at the horizon as a wide, white ribbon 80 at such time as the touchdown area is first within range. As the aircraft continues its approach, the ribbon will move down the screen in a continuously lengthening manner. As the ribbon reaches the bottom of the screen, the pilot knows that the touchdown area has been reached. The course centerline 72 is changed from white to black in the ribbon area of the display to provide improved viewing conditions.

The novel display also includes numerous other information sets which are normally difficult to integrate into a single presentation. Thus, as shown in FIG. 3A, radar altitude is provided in the same display by means of a numeric ribbon scale 82 located at the right hand side of the display, the scale in the presentation shown in FIG. 3A extending from 0–1500 feet. The major portion of the scale will be a linear presentation of altitude from 0–300 feet with indices presented at intervals of twenty feet.

Two index markers 86, 88 located in the left hand portion of the ground texture display are used to compare the captain's compass with the flight officer's compass. The white index indicates the compass heading of the captain's instrument, and the black index represents the compass heading of the flight officer's instrument. If there is no error, the two markers will be vertically aligned. Any error will cause the flight officer index to move horizontally, and the amount and direction of an error can be determined by using the azimuth heading scale 68 as a reference.

A glide slope deviation scale 89 provides information analogous to that presented on the glide slope indicator 22 of the horizontal situation indicator 8, the display basically comprising an electronically generated scale 89 having an associated pointer 91 which is displaced along the scale for different degrees of deviation. The scale has a range of plus-minus ½ degree which is subdivided into ¼ degree increments. The glide slope deviation exceeding one-half degree will cause the pointer to remain at full scale deflection until the error has been reduced. In some embodiments at a given low altitude (i.e., 50 feet, for example), the glide slope deviation information may be removed from the display, or locked at the center position.

A course select knob 76, a heading selector knob 94, a heading digital readout 96, a course digital readout 78, a pair of "TO-FROM" lights 92, 93, and distance measuring indicator 98 are located on the front of the panel, and are operated and used in the conventional mode.

A pitch trim control knob 100 located on the front panel permits the pilot to trim the display between +10 degrees and −5 degrees of the actual pitch angle. Four warning indicators on the front of the panel include a power failure indicator 102 consisting of a mechanical flag which is moved to the off position if power fails for any reason, a command failure indicator 104 which results in the illumination of a red indicator if any input signal to the flight command symbol is disrupted, a glide slope failure indicator 106 which consists of a red indicator which will light if the output signal from the glide slope receiver is disrupted, and a VOR-LOC failure indicator 108 which consists of a red indicator which will light if the output signal from the VOR-LOC receiver is disrupted.

TYPICAL DISPLAYS PRESENTED DURING OPERATION OF AIRCRAFT IN BLIND LANDING APPROACH

As will be apparent, there exists in the display all information necessary to inform the pilot as the extent and mode of operation of the basic aircraft controls including the ailerons, elevators, rudder and throttle to operate the aircraft in accordance with the computed commands as necessary to the proper handling of the aircraft in all modes of the aircraft handling, including take-off, climb, en route, approach/landing, go-around and roll-out taxi situations.

With reference to FIGS. 3B-3F, there is set forth thereat exemplary displays which will be presented to the pilot in a typical ILS approach. Pictorial representations of the horizontal situation of the aircraft is shown above each of the displays, and the attitude of the aircraft is shown below the displays as an aid to the understanding of the information which is provided by each display. By way of further explanation, illustrations of the display which would be presented by a course indicator 8 and flight director 9 (FIGS. 1 and 2) are shown adjacent to FIG. 3B for the same conditions of flight and command as are represented by the display in FIG. 3B.

It is assumed that at position 1 the pilot is departing his final navigational fix, and that the runway heading 252 has been dialed into the equipment by adjustment of course selector knob 76 (FIG. 3A) and the flight director computer has selected course 242 to intercept such heading. (While commercial aircraft include such equipment, not infrequently such intercept course will be provided from the control tower at the airport.)

As a result of dialing in the course 252, the far end of the course centerline on the display will be adjusted to the azimuth heading 252 degrees on the compass tape, and the near end of the course centerline will position itself relative to the deviation indicator 74 by a value consistent with the deviation of the aircraft from the selected vector.

With reference to position 1, with the aircraft on heading 242 and approaching the selected vector 252 as shown, the pilot will expect to begin a bank toward the right so as to arrive on the desired course and heading to reach the selected runway.

As shown in the display of FIG. 3B, the near end of the course line indicates a deviation of approximately two degrees from the selected course, and the roll scale at the top indicates a bank of 25 degrees has been initiated. The aircraft at the time of the display in FIG. 3B is on heading 242. The far end of the course centerline is still at 252 and the aircraft is banked to the right and turning into the selected course 252. The displacement of the fixed symbol (black) in a greater bank than the command symbol (white) indicates that the aircraft is banked too far, and the pilot's reaction should be to decrease the right bank until such time as the black symbol coincides with the white symbol. The radar altimeter in FIG. 3B is not displayed since the plane has not descended to below 1500 feet. The glide slope is above the aircraft, as indicated by the white marker adjacent the upper portion of the glide slope deviation scale, and as illustrated by the aircraft position sketch below FIG. 3B.

As the aircraft approaches position 2, the display (FIG. 3C) will be as shown (on course 252, zero bank and on glide slope). The command symbol and the reference aircraft symbol are coincident, and accordingly the pilot is informed that the aircraft is being flown in accordance with the command information.

As the aircraft advances to the position 3, the plane is shown by the display of FIG. 3D to be on glide slope, and the aircraft which is flying heading 242 has a crab correction to the left of ten degrees (the end of the course centerline is on the selected heading of 252 degrees and the heading of the aircraft is 242 degrees as shown by the azimuth tape).

The compass comparator information is removed as the pilot descends to below a certain altitude (1500' in the present embodiment) so that information to be observed on the display during the critical moments of landing is reduced. It is also apparent that the radar altimeter now appears on the display and the for end of the course centerline is white to indicate that the end of the runway or touchdown area is coming into view.

As the aircraft moves to position 4, the radar altitude as shown in FIG. 3E is ninety feet, and the aircraft is on glide slope, but not yet over the touchdown point. The incremental pitch lines have also been removed at this time to reduce clutter and simplify the presentation. The primary cue consisting of the horizon line will produce sufficient indication of the pitch at this time. As shown, the touchdown point has advanced farther down the display.

As the aircraft reaches position 5, the aircraft is over the touchdown point and in the landing attitude, and the flight command symbol has been moved laterally to the right calling for right rudder. Since the altitude is very low at this time, the glide slope information has also been removed. The pilot's response to such command is to apply right rudder to reestablish coincidence between the black reference vertical and the white command symbol. At this time, the aircraft should make contact with the ground.

GENERAL DESCRIPTION OF CIRCUITRY FOR PROVIDING INTEGRATED FLIGHT DISPLAY

With reference now to FIG. 4, there is shown thereat in block form the basic sensor and circuitry equipment which is utilized in the generation of the display 48. As there shown, the system basically comprises a plurality of sensor means 120 which sense the aircraft attitude and horizontal situation, and couple such information to a set of computers 122 which utilize such information to provide signals indicating the action to be taken to obtain the desired flight of the aircraft. Command signal generators 123 are responsive to the signals output from the computers 122 to generate signals which are fed to a display system 125 for presentation to the pilot as a visual display.

The sensor means 120 and the computer means 122 are well known and presently in use on commercial aircraft. Details of one commercial embodiment may be found, for example, in the technical manual entitled, "All Weather Landing Display for DC7" which was published June, 1964, by Sperry Gyro Company, Report No. RD64–71, and which is obtainable from the Clearing House for Federal Scientific and Technical Information of the United States Department of Commerce. Specific reference is made to pages 24, 25 for the computer circuitry and the inputs which are provided to the computers for use in providing command signals to the pilot.

For the purpose of the present invention, computer equipment 122 is shown to include an aileron computer 124, elevator computer 126, dacrab command computer 128, and speed computer 130. As shown in FIG. 4, the aileron computer 124 receives (a) signals indicating the aircraft heading from the directional gyro over input lead 132, (b) signals indicating the localized heading from the VOR/LOC receiver over the localizer input 134, and (c) signals over roll input 136 from the vertical gyro which indicate the aircraft roll attitude. The aileron computer 124 constantly provides roll command signals over roll output conductor 138 to command roll module 162 for use in adjusting the flight command symbol 58 (FIG. 3A) as generated by flight command generator 160 to different relative positions of roll displacement.

The elevator computer 126 receives (a) altitude information over input conductor 140 from the air data system (altimeter, etc.) of the aircraft, (b) glide slope information over input conductor 142 from the glide slope receiver, and (c) pitch information over conductor 144 from the vertical gyro. The elevator computer 126 provides pitch command signals over output conductor 146 which as will be shown determine the vertical displacement of the flight command symbol 58 from the display center.

Decrab command computer 128 receives course error information over conductor 148 from the aircraft course selector and directional gyro equipment and operates in a conventional mode to provide yaw command output signals over conductor 150 which as will be shown are used to effect lateral displacement of the flight command symbol 58 from the display center to provide yaw (rudder) commands to the pilot. Brief reference is made hereat to the fact that in equipment now used in the field, the decrab information is displayed to the pilot as movement of an indicator which comprises a small scale and associated pointer, and it is necessary during critical periods of landing to integrate both the different information bits provided by the two instruments (FIG. 2) as well as the decrab information provided by this small, poorly positioned indicator. It is apparent that in the present system such information is integrated directly into the novel command symbol, and an improved, more reliable system is achieved.

Speed computer 130 receives instantaneous vertical speed signals over conductor 152 from the aircraft IVS indicator; flap compensator signals over conductor 154 from the aircraft flap position sensor; and angle of attack signals over conductor 156 from the aircraft angle of attack transmitter. Speed computer 130 is operated in a known manner to provide output signals over conductor 158 indicating command speed which signals, as will be shown, are used to effect movement of the dashed centerline 72 of the course centerline symbol toward the horizon or toward the bottom of the display in the throttle command.

Command speed in the newer aircraft equipment is achieved by direct control of servos which operate the throttle when the unit is connected in the automatic throttle mode. However, in some aircraft, the command throttle information is coupled to a unit having a graduated scale which is located on the left hand side of the attitude director indicator, and an associated pointer is displaced along a vertical axis to indicate the request for more or less throttle. The continued observation and the novel manner of an animated presentation of throttle speed in the present display considerably reduces the possibility of pilot error.

As noted above, the outputs of the aileron computer 124, elevator computer 126, decrab command computer 128 and speed computer 130 as presently used in commercial aircraft are connected as inputs to the novel signal generators 123 of the present invention to effect the generation of the displays of FIGS. 3A–3F. The flight command generator 160 is controlled by the pitch command signals and yaw command signals output over conductors 146, 150 from the elevator computer 126 and the decrab command computer 128, respectively, and is operative to effect generation of the inverted T flight command symbol 58 at a position on the display which is a function of the value of the pitch and yaw command signals. The output of the flight command generator 160 is in turn connected to command roll resolver module 162, which adjusts the symbol about its roll axis by an amount related to the aircraft bank required as indicated by the signals output over conductor 138 from aileron computer 124.

The command roll resolver module 162, as will be shown, basically comprises a sine-cosine pot which modifies the signals input from the flight command generator 160 in accordance with the roll command signals received from the aileron computer 124 and the actual roll signals input over path 170, whereby the symbol is displaced about its roll axis by an amount related to the difference between the command roll and the actual roll.

The signals output from command roll resolver module 162 are fed over an X channel and a Y channel to the horizontal and vertical deflection circuits 164 which are operable to control the position of the electron beam of the cathode ray tube 167 during the period the beam is used to trace the command symbol.

The horizontal and vertical deflection circuits 164 for the cathode ray tube 167 are controlled at other times by timing generator 180 which provides horizontal sync pulses over conductors 182, 182' and vertical sync pulses over conductors 184, 184' to the horizontal and vertical deflection circuits 164 to control same in the cyclic provision of a raster at a sixty cycle rate. Additionally, as will be shown, sweep hold pulses provided by the timing generator 180 over conductor 186 occur during the retrace period to terminate the raster sweep for a brief period of time (in the order of 20 lines), and during such period the input signals from the flight command generator 160, 162 to the horizontal and vertical deflection circuits 164 control the beam in the writing of the command symbol on the display at the X, Y position and roll attitude indicated by the signals received from the computers 122. A signal from timing generator 180 over conductor 191 controls the video amplifier 168 to unblank the gun of the cathode ray tube 167 during the period of the command symbol trace.

The command signal generators 123, in addition to the flight command generator 160 for providing the command symbol on the display unit 167, also includes a separate video generator 174 which generates video signals for coupling over conductor 176 to video amplifier 168 and the electron gun of the display tube 167. The video signals which are electronically generated by video generator 174 in a manner to be described have waveshapes such that as applied to the gun during a raster trace, will effect the generation of the dynamic display shown in FIGS. 3A–3F including the sky portion, horizon line and a ground portion of varying intensity. (The flight command symbol 58 was generated by circuits 160, 162.)

The signals output from the video generator 174 are synced to the raster trace provided on the cathode ray tube 167 by timer generator 180 which provides horizontal sync pulses and vertical sync pulses over conductors 182, 184 to the video generator 174. Clock pulses are provided by timing generator 180 over conductor 185 at the rate of approximately 4 million p.p.s. for a purpose to be described.

Preliminary to a detailed description of the video generator 174, a brief description is set forth hereat of the input signals which are applied to the video generator 174 along with a brief outline of the portions of the display shown in FIG. 3A which are provided thereby. As will be shown, the video generator 174 is comprised of a plurality of separate waveform generators including a basic cue generator 210 (FIG. 5) which provides signals having a wave shape which traces the sky portion 52, the horizon line 50 and ground portion 54 of the display. Such generator may be of the type set forth in Reissue Pat. 25,756 which issued Apr. 6, 1965, and which is assigned to the assignee of this invention. The position of these basic cues on the screen varies with changes in the pitch of the aircraft. Signals indicating the pitch changes are provided from the vertical gyro over pitch lead 190 (FIG. 4) to the video generator 174. With a pitch down condition, for example, the changing signal input will result in movement of horizon line 50 toward the top of the display and the display of a decreased sky portion and an increased ground texture portion. The waveforms which generate the pitch lines 60 are similarly adjusted to effect a corresponding change in the display of the aircraft pitch attitude.

With banking of the aircraft, roll signals received over roll input 170 from the vertical gyro control a roll servo 172 in the adjustment of a servo mechanism, which rotates the yoke assembly on the cathode ray tube 167 by an amount proportional to the degree of aircraft bank. The display 48 (independent of the command symbol 58) is banked by a corresponding amount and the roll pointer 64 is displaced along the roll scale 62 to provide a numerical readout of the degree of bank of the aircraft.

With changes in heading of the aircraft, appropriate indications are provided from the directional gyro over input conductor 192 to the video generator 174 which in turn effects a corresponding adjustment of the azimuth heading scale 68, assuming for example in FIG. 3A that the aircraft is turning to the right, the scale will move toward the left.

Signals provided over the course error input conductor 194 to the video generator 174 control the generator to adjust the far end of the course line 75 and assuming the turn is of a corrective nature, the far end of the course line will move to the left with the heading scale in its lateral adjustment across the screen.

The VOR/LOC displacement signal received over input circuit 196 from the VOR/LOC receiver equipment on the aircraft and video generator 174 effects a variation in the output signal which displaces the near end of the course line from the center of the deviation scale 74 a distance which is related to the signal value. As will be shown, the course deviation scale 74 is rotated with rotation of the yoke assembly on the tube 167 in response to banking of the aircraft and the near end of the path is always adjusted relative to such scale.

Input signals from the compass comparator are fed over conductor 198 to the video generator 174 to indicate differences in the reading on the two aircraft compasses and generator 174 effects a corresponding change in time of generation of the signals to effect relative displacement of the white and dark markings 86, 88 (FIG. 3A) to indicate the degree of correspondence of the compass of the flight officer and the captain. In addition, the video generator 174 receives signals over conductor 200 from the radar altimeter indicating the altitude of the aircraft and the video generator 174 is operative to provide signals which result in a related adjustment of the indicating tape on the radar altitude scale 82.

The video generator 174 is also connected over conductor 202 to the glide slope receiver, and is operative to adjust the pointer 91 on the glide slope deviation scale 89 to a position which indicates the amount of deviation of the aircraft from the glide slope.

The video generator 174 is further connected over conductor 158 to throttle command equipment, and is operative responsive to receipt of command signals to adjust the symbols which make up the course centerline 72 to move toward the horizon or toward the base of the display with decrease and increase of the speed of the aircraft relative to a command speed.

Signals indicating the position of the aircraft relative to a selected touchdown point are fed over conductor 206 to the video generator 174 which is operative responsive thereto to provide a white video output which results in the presentation of the touchdown area 80 (FIG. 3A) in a corresponding, related position on the display.

The manner in which the input signals described above are used to vary the time and shape of video waveforms for coupling over conductor 176 and video amplifier 168 to the gun of the display tube 167 in synchronism with the raster trace to produce a display of the type set forth in FIGS. 3A–3F on the display tube 167 will now be set forth in detail.

SPECIFIC GENERATOR CIRCUITRY

Basic Cues

With reference now to FIGS. 5A, 5B, the video generator circuitry 174 is set forth in more detail thereat. The basic cues of the display which include the sky portion 52, horizon 50, and ground texture 54, may be generated by using a basic cue generator 210 which is of the type set forth in the above identified Reissue Pat. 25,756, specific reference being made to the circuitry shown in FIGS. 12 and 16 of such patent.

In the present arrangement, the basic cue generator 210 (FIG. 5) is controlled by (a) the vertical sawtooth output over conductor VS from the timer generator circuit 180 at the raster rate, (b) the vertical sync signals input over conductor 184, and the signals indicating the pitch of the aircraft input over conductor 190 from the vertical gyro. As shown in such patent, the horizon generator basically comprises a comparator circuit which compares the changing voltage of the sawtooth (which changes at the raster rate) against the voltage input on pitch conductor 190. The raster trace in such disclosure proceeded from top to bottom. Prior to the generation of the horizon line, the clipped portion of the differentiated signal shown in FIG. 16 thereof (the straight line portion which precedes the negative-going pulse) is mixed with the signal output of amplifier circuit 139 to provide a sky portion of relatively light intensity which extends downwardly from the upper margin of the display to the horizon line. As the negative-going portion of the pulse is mixed with the output signal of the amplifier stage 139 to the video amplifier 145, the negative-going pulse effects the trace of dark horizon line across the screen. As the trace approaches the bottom of the raster, the pulse then slowly proceeds in a positive direction and the texture of the ground pattern traced below the horizon line becomes gradually lighter. Thus, by adjusting the voltage into the square wave generator 138 to a different value, the trailing edge of the square wave is generated at different time periods relative to the vertical sync pulse which triggers each raster trace, and a corresponding adjustment of the time of trace of the horizon line from the top marginal edge of the display device is effected. Obviously, in a raster trace which is in the opposite direction (bottom to top) the same procedure may be used.

In the event that the signals received from the interface section are digital signals, the basic cues including the sky, horizon and ground texture will be generated in the manner set forth in the application of Kent Myles Cornell et al. which was filed Oct. 23, 1964 having Ser. No. 318,208 and assigned to the assignee of the present invention.

Pitch Line Generator

The pitch line generator 216 (FIG. 5B) is operative in response to pitch signals on input conductor 190 to produce the necessary video signals to generate and correctly position each of the display pitch lines 60 (FIG. 3A). The pitch lines are artificial references which define the particular assigned elevation angle above the horizon line. Thus the pilot will, at all pitch attitudes, have available symbology which will simultaneously provide a horizontal reference for determination of roll angle and which will accurately quantize pitch attitude.

In the present embodiment, major pitch lines are defined and presented at the following pitch angles: +90°, +60°, +30° (above the horizon), and −30°, −60°, −90° (below the horizon). Minor or incremental pitch lines are provided at +25°, +20°, +15°, +10°, +5°, −10°, −15°, −20°, −25°. The minor lines further assist in rapid and accurate pitch attitude determination.

The location vertically of each pitch line, major or minor, is determined by applying a vertical sawtooth VS from timing generator 180 and pitch voltage 190 (DC) to each of a plurality of discrete voltage comparators, such as 219A–219K, each of which is connected to provide a different one of the lines as indicated. A different offset reference voltage source, such as 220A, 220B, etc., has a value predetermined by and related to the pitch line to be generated by its associated comparator 219A, etc., the reference voltage provided by the different sources being of a different value. At the point in time along the vertical sawtooth where the sawtooth voltage level is equal to the algebraic sum of the variable pitch voltage and fixed offset voltage fed to a comparator, such as 219A, the comparator is triggered. Since different comparators have different summated values, only one comparator is triggered at any one time, and the ones of the comparators which are triggered in a raster trace is basically determined by the value of the pitch signal on conductor 190.

The major pitch lines extend laterally across the full width of the display. Hence the pulses provided by the comparators in the major pitch line circuit 230 are provided for a full raster line and are grouped by OR gates 235, 236 into white video signals, and by OR gate 237, and inverter 238 and OR gate 239 into black video signals for applications to the video mixer 214 (FIG. 5A).

The resultant waveform output from a comparator such as 219A, for a minor pitch line, is applied to an appropriate pulse shaping network to produce pulses of different predetermined width, as will be shown. That is, the incremental pitch lines do not extend across the full display width. In one embodiment, the ±5°, ±15°, ±25° lines are approximately ½ inch long and the ±10°, ±20° lines are approximately 1 inch long, and are symmetrical about the display center. Thus it is necessary to form gating pulses at the horizontal frequency which correspond to the desired line length.

A binary counter 225, which is shown as an eight stage counter, advances through a predetermined count sequence with the receipt of clock pulses from the timing generator during each horizontal line trace at a frequency of approximately 4 million p.p.s. The counter is reset at the end of each line trace by a horizontal sync pulse over conductor 182 from timer generator 180.

Pulses are decoded from counter 225 at predetermined counts by the wiring of the appropriate counter outputs (A, $\overline{B}$, $\overline{C}$, etc.) to the AND gates 227, 229, 241, 242. The predetermined counts wired into these gates define the left edge and right edge of both the longer (1″) and the shorter (½″) incremental pitch lines as defined by the basic timing scheme. Flip-flop 231 is operated by the pulse outputs of the AND gates 227, 229 to establish a pulse which corresponds in duration to the shorter (½″) pitch lines. Flip-flop 243 is similarly operated by pulse outputs of AND gates 241, 242 to produce a pulse of duration corresponding to the longe (1″) pitch line. These outputs are supplied to AND gates (flip-flop 231 pulses to AND gate 223, 224 and flip-flop 243 pulses to AND gates 244, 245) to effect inhibiting of the pitch line video at all points along the horizontal trace except those points within the pulse "aperture."

To digress, it will be recalled that pitch lines above the horizon (positive pitch angles) are to be black and those below the horizon (negative pitch angles) are to be white. The pulse outputs from the incremental pitch line voltage comparator circuits are applied to OR gates and thus segregated into groups corresponding to pitch line length (½″ or 1″) and shade (black or white). Thus OR gate 221A receives inputs corresponding to +25°, +15°, +5° (½″ long and black), OR gate 221B segregates +10°, +20° (1″ long, and black), OR gate 221C segregates −5°, −15°, −25° (½″ long and white), OR gate 221D segregates −10°, −20° (1″ long and white). The pulse group outputs of the OR gates are then supplied as inputs to AND gates 224, 223, 244, 245. As previously discussed, each pair of gates 223, 224 and 244, 245 also receive one of the two horizontal pulses defining line length. And gate 223, for example, will provide a pulse output during the line traces in which a pulse from gate 221A indicates one of the comparators 219A, 219E, 219F, is triggered and further during the measured period in such line trace during which an input is provided by flip-flop 231 to the second input of AND gate 223.

Thus, the outputs of these gates are pulse groups which will produce pitch lines of proper length and thickness and at the correct vertical position. Those pulses defining the black lines are further inverted by gate 233, for example, to obtain correct black pulse polarity. All white video pulses are then mixed over OR gate 236 and all black pulses are mixed over OR gate 214B for application to the video mixer 214 (FIG. 5A).

COURSE CENTERLINE

The course centerline generator 250 which generates the course centerline 72 with runway background 73 on the display (FIG. 3A) is shown in block in FIG. 5B and in more detail in FIGS. 8g, 8h and 11. As generally shown in FIG. 5B, a first input circuit is connected over conductor 196 to receive a VOR/LOC displacement signal, a second input is connected over conductor 194 to receive a course error signal, a third input is connected over conductor 190 to receive pitch indication signals, a fourth input is connected over conductor 191 to the basic cue generator circuit 210 (and specifically to the horizon line generator circuit therein), a fifth input circuit is connected over conductor 184 to the vertical sync signals output from timer generator 180 and a sixth input circuit is connected over conductor 182 to the horizontal sync output of timer generator 180. The signal output of course centerline generator 250 is connected over conductor 258 to a group of Centerline Gating Circuits CLG and video mixer 214 (FIG. 5A) for coupling to the video amplifier 168 and display means 167 (FIG. 3).

The course centerline 72, at times other than touchdown, as shown in FIG. 3A, comprises a broken or dashed white line 72a extending from the horizon to the base of the display as the centerline for a runway portion 73 which is comprised of a solid dark portion which is broken with the centerline, as shown, and which has only edges which taper inwardly from the base to the horizon to provide an appearance of perspective in the display. As the aircraft approaches a touchdown position, as in an ILS approach, the runway background changes to white and the centerline becomes darkened as shown by the top segment of the course centerline in FIG. 3A.

As will be shown, the far end of the course centerline 72 is displaced laterally from the center by an amount which is proportional to the value of the course error signal provided over conductor 194 (FIG. 5B). The near end of the course centerline 72 is displaced laterally from the center position (FIG. 3C) to different positions as a function of the displacement of the aircraft from the localizer beam which is indicated by the value of the VOR/LOC displacement signal received over conductor 196 (FIG. 5B).

The course centerline generator 250 is synchronized in its operation with the raster on the display by the vertical sync signals received over conductor 184 from the timer generator 180. The generation of the far end of the course centerline, as will be apparent from FIGS. 3A–3F, is tied to the horizon line generation, the signals for effecting such manner of generation being provided over input conductor 191. Pitch signals input over conductor 190 are utilized to maintain the far end and near end of the path at the same lateral displacements (X coordinate) at both the horizon line and bottom marginal edge even though changes in pitch of the aircraft are experienced. As will be shown, if the line is to be maintained at the X coordinate on the horizon line (and the bottom marginal edge) with changes in the aircraft pitch attitude, the slope of the course centerline must necessarily be adjusted to compensate for these changes.

Variation of the centerline and runway presentation is effected by course centerline gates CLG in response to a signal output from touchdown point generator 389 as will be more fully disclosed.

MOTION DISPLAY REQUIREMENTS

The generating circuit for the course centerline 72 is shown in detail in FIGS. 8g and 8h. However, the purpose and operation of the circuit is perhaps best understood by first considering the motion requirements imposed upon the circuitry in the provision of the desired course centerline, reference being made to FIGS. 8a–8d for such consideration.

With reference, first, to FIG. 8a, there is illustrated thereat in an abbreviated showing, the manner in which the course centerline must be competent to pivot about a point which intersects the bottom of the screen, in response to receipt of a course error signal indicating a difference between the aircraft heading and selected course (assuming zero signal for the near end and zero pitch).

In a similar manner with reference to FIG. 8b, with the receipt of a signal indicating a VOR/LOC displacement (assuming zero input for the far end and zero pitch) the near end of the centerline must pivot about a point at the horizon line. Assuming that the inputs for the far end and the near end illustrated in FIGS. 8a and 8b are applied simultaneously at zero pitch conditions, the course centerline must be displayed as shown typically in FIG. 8c.

In a similar manner, assuming changing pitch conditions, and assuming the same input signals for the far end and near end, the point at which the course centerline intersects the horizon line and bottom of the screen must remain at the same lateral distance from the display zero reference point. Thus, for example, with a pitch down condition and the same VOR/LOC and course error signals assumed in FIG. 8c, the course centerline must be generated to appear on the display as shown in FIG. 8d. With a pitch-up condition, and the input signals assumed in FIG. 8c the display must appear as in FIG. 8e.

It will be apparent with reference to these figures that the slope of the course centerline must change with the pitch; however, the position of intersection of the course centerline with the horizon line and the bottom of the display must remain at a fixed distance from the zero reference or horizontal display center. The foregoing examples are representative of only a few of an infinite number of displays which the system must achieve in response to variation of pitch, course error and VOR/LOC conditions, and are indicative of the vast flexibility required of the system in the presentation of the far turn and near turn information required in an integrated display.

SPECIFIC COURSE CENTERLINE CIRCUITRY

With reference now to FIGS. 8g and 8h the circuitry capable of achieving the display of a course centerline with these motion requirements is set forth thereat. In describing the circuit operation, reference will first be made to the manner in which a centerline generator circuit CG will effect the generation of the centerline with the far end and near end located at the display center (i.e., extending from the horizon vertically down to the base of the display, as shown in FIG. 3c, for example). Thereafter the runway generator circuitry RG for generating the background of runway portion 73 of the course centerline is described, and subsequently the course line generator circuitry for effecting adjustment of the near end and far end of the centerline and runway to conditions related to the input signals received over near turn and far turn conductors 194, 196 will be set forth. Finally, the circuitry for effecting normal shading of the course centerline and the path, and the manner in which variation of such shading is achieved as the touchdown area is approached is set forth.

"CENTERLINE GENERATOR CG"

With reference to FIGS. 8g and 8h, the circuitry for generating the basic centerline is shown to include a horizontal sawtooth generator 251, the frequency of operation of which is controlled by input signals over the horizontal sync conductor 182 from timer generator 180 (FIG. 5) to provide a horizontal sawtooth at the frequency rate of 15.75 kc. over output conductor 252. The output of the sawtooth generator 251 is extended over conductor 252 to voltage comparator and triangle generators 253, 320 for the purpose of establishing a reference waveform of changing value during the successive line traces in the raster.

With reference to FIG. 8f a sawtooth 251 is provided over conductor 252 to one input of the voltage comparator and triangle generator 320 during each line trace of the raster, the duration of the sawtooth being the same as the duration of changing line trace. A second signal input for circuit 320 receives a signal over conductor 317 which varies in value to indicate the different positions on a line at which the course centerline is to be provided. As the signal on conductor 317 representing the course centerline position for a line being traced is exceeded by the sawtooth voltage, the triangle generator 320 is operative to provide an output triangle wavefrom over conductor 321. Adjustment of the reference voltage 317 to different values will obviously result in the displacement of the time of generation of the triangle in a line laterally to either side of the center position shown. Thus a lower value reference signal on conductor 317 will result in the earlier occurrence of a triangle in a line trace, and a larger value reference signal will result in the generation of the triangle at a later point in a line trace.

The comparators, such as 322, may in their simplest configuration comprise a semiconductor switching device normally biased by reference voltage such as 323 to conduct and biased to cutoff as the input over conductor 321 exceeds such bias. The signal output during the period of cutoff will be a rectangular pulse, as shown in FIG. 8h, the width of which varies with the width of the triangle waveform input at the level of the reference voltage. Manifestly if the triangle occurs at the same time in each successive line trace in the raster, a vertical centerline will be drawn. If the triangle is generated in each line trace at the time shown in FIG. 8f, the vertical line will occur in the middle of the display as shown in FIG. 8c. A change in value of the reference voltage from source 323 varies the centerline width in an obvious manner. As indicated above, the signal on conductor 317 during each line trace will be determined by the near end, far end and pitch signals input to the circuitry in FIG. 8g as will be described.

RUNWAY GENERATOR RG

The circuitry for providing the runway portion of the course centerline comprises a voltage comparator and triangle generator 253 which is operated in like manner by signals on conductor 252, 317 to provide a triangle waveform output on conductor 254 which moves laterally to different positions on the line for different near turn, far turn input signals.

The runway generator further includes an operational amplitude 279 which has a fixed amplifier sawtooth input over conductor 278 at the vertical trace rate of 60 cycles per second, and a reference voltage 280 which is preset in accordance with the value of the runway width to be provided. The output of operational amplifier 279, which is effectively a variable D.C. sawtooth signal which is inverted relative to the fixed amplitude sawtooth input to amplifier 279 is referenced to runway width voltage 280. Such signal is compared in voltage comparator 255 with the triangle waveform input over conductor 254 from the voltage comparator and triangle generator 253.

It will be seen from the representative waveform A shown adjacent the output of voltage comparator 255 (assuming a raster trace from bottom to top) that the fixed amplitude sawtooth has its largest value at the bottom of the trace and will effect conduction of the voltage comparator 255 earlier in the initial line trace of the raster than during later line traces. As a result the triangle input over conductor 254 to comparator 255 in the first line trace of a raster will appear at the output 256 as a pulse of relatively wider dimension. As the raster trace progresses upwardly and the voltage of the sawtooth progressively decreases, the voltage comparator 255 is conductive at successively later intervals in the line trace, and a correspondingly smaller portion of the triangle apex is amplified and appears on conductor 256 as a relatively narrow pulse of correspondingly reduced length (see waveform B).

As a result the runway portion narrows as the trace proceeds from the bottom toward the horizon (see FIG. 3a for example) to provide an appearance of perspective on the display. Variation of the reference voltage 280 varies the width of the runway and variation of reference voltage 323 varies the width of the centerline.

The resultant signals on conductor 256 are coupled to one input of OR gate 294 and one input of AND gate 292 in diode mixer 257. The second input of OR gate 294 is connected over resistance 296 to a reference voltage, and the second input of AND gate 292 is supplied by signals on conductor 234 as fed over inverter 291. The resultant waveform output of AND gate 292 is shown adjacent conductor 292'. The output of AND gate 292 is amplified by amplifier 293 and coupled to one input of AND circuit 295. The second input of AND gate 295 is connected to the output of OR gate 294. The resultant waveform output 295 is shown adjacent conductor 258.

Summarily stated, the signals input over conductor 256 to diode mixer 257 provide a black video output during the period RR of the line trace, which period is determined by the width of the pulse output from voltage comparator 255. The signals on conductor 234 output from centerline generator CG as fed to diode mixer 257 results in white video output CC, the duration of which is related to the width of the pulse output from voltage comparator 322.

The manner in which the centerline generator CG and the runway generator RG are tied to the horizon generator (and the manner in which variable signal inputs are generated for transmission over conductor 317 to provide shifting of the near end and far end on the course centerline on the display is now set forth.

TYING OF RUNWAY GENERATOR TO HORIZON

As indicated in FIGS. 8a–8d, the far end of the course centerline and runway are tied to the horizon and move vertically therewith. Such relationship is achieved by synchronizing the generation of the fixed amplitude sawtooth, which is provided over conductor 278 (FIG. 8g) to the runway generator RG, to the horizon line and the bottom of the raster trace. As shown by the waveform adjacent conductor 282 the sawtooth is inverted in amplifier 279 so that the maximum value of the sawtooth occurs at the bottom of the trace and the value decreases progressively until the trace of the horizon line occurs.

More specifically the fixed amplitude sawtooth generator circuit 272 includes a first input 277 over which D.C. signals variable in value with pitch are received, a second input circuit 275 over which a fixed D.C. reference voltage is received, and a third input circuit 271 over which signals indicating the start of the raster trace and the trace of the horizon line are provided.

The horizon line sync signal on conductor 271 is provided by a flip-flop 270 which has inputs connected to the horizon line sync pulse conductor 191 (FIG. 5A) and to the vertical sync pulse conductor 184 from the timing generator 180 (FIG. 5A). The flip-flop 270 is shifted from its first or normal condition with the receipt of the vertical sync pulse over conductor 184 at the start of the raster trace, and remains in such state until receipt of the horizon line sync pulse over conductor 191. The output waveform provided by flip-flop 270 in each raster trace is shown adjacent to the output conductor 271, the extreme ends of such waveform representing the start and end of each raster trace. As the first segment of the waveform is fed over the input circuit 271, fixed amplitude sawtooth generator 272 initiates generation of the sawtooth (assuming a raster trace from the bottom to top of the display) which continues until generation of the positive-going portion of the input waveform on conductor 271 at the time of the horizon line sync. The sawtooth generator 278 as shown provides a waveform having a positive-going leading edge followed by a rapid retrace at the horizon line. As will be described in more detail hereinafter, signals variable with pitch of the aircraft are fed over conductor 190, isolation amplifier 276 and conductor 277 to the fixed amplitude sawtooth generator 272 for the purpose of modifying the charging rate of the capacitor which determines the slope of the sawtooth output in such manner that the generated sawtooth will always have a fixed amplitude regardless of the sawtooth duration (which changes with the pitch angle of the aircraft). Stated in another manner, the sawtooth must have a fixed amplitude and yet must occur between the start of the raster trace and the time of generation of the horizon line (which changes in position with changes in pitch). With reference to the waveform adjacent conductor 278 the point of occurrence of the trailing edge of the sawtooth identified by "$H_L$" must be laterally displaced in time to the left or right as indicated. If the aircraft pitches down, the horizon line $H_L$ occurs at a later time in the raster trace and the charging rate must be decreased so that the slope of the sawtooth is of a more gentle slope. Alternatively, if the aircraft pitches up, the charging rate must be increased so that a sawtooth having an increased slope is provided.

The resultant sawtooth which is of variable slope with changing pitch (but always of a fixed amplitude, which amplitude is determined by the value of the fixed reference voltage 274 provided over input 275) is fed over conductor 278 to the amplifier 279 in the runway generator circuit RG. The changing slope of the sawtooth for the different pitch conditions of the aircraft as fed to the runway generator RG results in corresponding variations in the resultant runway perspective appearance for various pitch attitudes.

The fixed amplitude sawtooth is also fed to operational amplifier 312, 314 in the near end, far end generator circuitry for the course centerline as will be shown.

LATERAL DISPLACEMENT OF NEAR END AND FAR END COURSE CENTERLINE

The circuitry thus far described, effects generation of the course centerline and runway background, which as generated comprises a wedge-shaped runway having an apex tied to the horizon, and a base tied to the bottom marginal edge of the display, the slope of which is varied so that with adjustment of the horizon line as a result of changing pitch attitude of the aircraft, the near end and far end are positioned at the same horizontal (X) coordinates. The manner in which the circuitry is operative to adjust the near end and the far end of the course centerline and runway to different positions with the receipt of different course error and VOR/LOC signals is now set forth.

It is recalled that the course centerline as generated by the course centerline generator CG with no error signal input comprises a vertical line which extends from the horizon to the lower marginal edge at the approximate vertical center of the display, (see FIG. 3c for example) and the runway generator RG provides a background comprised of a wedge-shaped darkened path.

With the receipt of course error signals over far turn conductor 194 indicating the extent of difference between the heading of the aircraft and the selected course, the far end of the course centerline must be displaced laterally by a corresponding amount and in a related direction. With displacement of the aircraft from the path designated by the VOR/LOC equipment, the near end of the course line must be displaced by a corresponding interval and in a related direction. As noted above, with changes in pitch (and assuming no changes in the far turn and near end input signals) the course centerline must intersect the horizon line and the bottom marginal edge at exactly the same horizontal coordinate.

In accomplishing such manner of operation, course error signals are fed over conductor 194 to a far turn channel FTC which includes a subtractor operational amplifier 300, a variable sawtooth generator 302 and a subtractor operational amplifier 314. The VOR/LOC displacement signals are fed over conductor 196 to a near turn channel NTC which includes a subtractor operational amplifier 306, a variable amplitude sawtooth generator 310 and a subtractor operational amplifier 312. The outputs of both channels are referenced to a fixed voltage output from source 273 and fed over adder operational amplifier 315 to the Runway Generator Circuit RG and the Centerline Generator Circuit CG to effect a corresponding adjustment in the position and slope of the course centerline 72. The nature of the signals provided, the mode of operation, and the resultant display are now set forth.

FAR TURN CHANNEL

As noted above, the far turn channel includes a subtractor operational amplifier 300 having a first input connected to conductor 194 to receive the course error signals, and a second input circuit connected over conductor 275 to the reference voltage source 274. The input signals received over course error conductor 194 comprise a variable DC signal from the course error sensor equipment on the aircraft. The operational amplifier 300 generates a signal corresponding to $[A3(E_B-E_F)]$ where $E_B$ is the reference signal, $E_F$ is the course error signal and $A_3$ represents the amplifier characteristic of operational amplifier 300. The value of the amplified course error signal determines the amplitude of the sawtooth to be generated by generator 302, different values of the error signal resulting in sawtooth waveforms of different amplitudes.

The amplified output of the operational amplifier 300 is fed over conductor 301 to the variable amplitude sawtooth generator 302 which is operative at the vertical trace rate of the raster (60 cycle/sec.). The sawtooth generator 302 includes a second input circuit connected over conductor 271 to the flip-flop 270 which, it will be recalled, provides a first signal (negative) during the period of the generation of the ground portion of the raster display (assuming trace from bottom to top of the raster), and a second signal (positive) with generation of the horizon line and sky portion of the display. Sawtooth generation by generator 302 is initiated with receipt of the leading edge of the first signal (i.e., at the start of the raster trace). A third input circuit connected with conductor 277 provides signals to the sawtooth generator 302 which vary with the pitch of the aircraft (i.e., from isolation amplifier 276 and pitch input 190). As will be shown in more detail hereinafter, the pitch input over conductor 190 results in modification of the slope of the sawtooth output but does not vary the sawtooth amplitude—the amplitude output by generator 302 is varied only as a function of the course error signal input over path 301.

The resultant variable amplitude sawtooth output on conductor 303 is referenced to the fixed amplitude sawtooth output from generator 272 in subtractor operational amplifier 314. By way of example, for zero far turn output, the variable amplitude sawtooth of sawtooth generator 302 (the amplitude of which is determined by the course error signal input over conductor 194) will be equal to that of the fixed amplitude sawtooth waveform which is output from sawtooth generator 272. For a positive or negative far-turn input over conductor 194, the amplitude of the variable sawtooth output from generator 302 will be greater or less than that of the fixed sawtooth.

Since the duration of both the variable and fixed sawtooth are tied to the bottom of the raster and the horizon line (i.e., both are generated as a function of pitch), both sawtooth generators 272 and 302 must have the capability of adjusting the charging rate and waveform slope for different pitch conditions. The circuitry which effects such manner of operation is shown in FIG. 11 and will be described more fully hereinafter.

With reference to FIGS. 9c–9d, there are shown thereat exemplary waveforms which are provided by the sawtooth generator 272 and the variable sawtooth generator 302 for a zero pitch condition, as referenced to the system vertical sync signal (FIG. 9a) and the signal output of the horizon line flip-flop 270 (FIG. 9b). In the illustration of FIG. 9b, it will be apparent that the vertical wavefront edge H1 (which occurs as the horizon line is traced) indicates a horizon line at the approximate center of the raster (i.e., zero pitch condition of the aircraft). With display of the horizon line closer to the bottom marginal edge of the raster as the result of a pitch-up condition, the vertical front H1 of the waveform will be moved to the left, and with a pitch-down condition (the horizon line closer to the top of the display) the vertical front H1 will be moved towards the right.

As shown in the zero pitch display of FIGS. 9c and 9d, the waveform output of the fixed amplitude sawtooth generator 272 and the variable amplitude sawtooth generator 302 are of equal amplitude and have like slopes. Further, the vertical trailing edge of the sawtooth occurs at the time of the horizon line trace. As indicated, the output of the fixed sawtooth generator 272 is basically determined by the value of the reference voltage $E_B$ as output from source 274, and the amplitude of the variable sawtooth generator 302 is determined by the value of fixed reference voltage $E_B$ and the input signal $E_F$ which indicates the value of the course error.

The fixed amplitude sawtooth is shown once more in FIG. 10a, for reference to the variable amplitude output of the far turn generator 302 in FIG. 10b. As there shown the variable sawtooth varies with respect to the fixed amplitude sawtooth for changing course error signal, the solid line representing the sawtooth for $E_F=0$ (zero course error) and the dotted lines $E_F$ MIN and $E_F$ MAX representing the amplitude or variations for course error signals in both directions from zero. With reference to FIG. 10c, the waveform output from the subtractor amplifier 314 responsive to the inputs of FIGS. 10a, 10b from generators 272, 302 is shown thereat. As illustrated with zero course error signal ($E_F=0$) zero output is provided, and with variation of the value of the course error signal showing an error in one direction ($E_F$ MIN), a positive going sawtooth of related amplitude is provided and with a course error signal showing error in the opposite direction ($E_F$ MAX) a negative going signal is provided.

With reference to FIGS. 9e–9g, it will be apparent that with a pitch-up condition (display of the horizon line closer to the lower marginal edge of the display as shown by line H1), the amplitude of the sawtooth output from the fixed amplitude sawtooth generator 272 remains the same, but the slope of the sawtooth has been changed so that generation of the sawtooth occurs in the shorter period required for the raster trace to advance to the point at which the horizon line is traced ($V_S$ to $H_L$). The sawtooth output from the variable sawtooth generator is shown in FIG. 9g to have the same amplitude as the fixed sawtooth (i.e., zero course error signal input over conductor 194) and the slope is changed as in the case of the fixed sawtooth so that the trailing edge of both sawtooths occurs simultaneously with the horizon line trace (H1) on the display. Thus with the sawtooth of FIGS. 9f, 9g fed to subtractor 314 (FIG. 10c), the output of subtractor 314 is zero.

Referring now to FIGS. 9h–9j, the waveform outputs of the fixed waveform generator 272 and variable sawtooth generator 302 for a pitch-down condition are shown thereat. In such event, the horizon line is drawn closer to the upper marginal edge of the display, and accordingly the charging rate of the fixed sawtooth generator 272, and variable sawtooth generator 302 have been decreased so that a more gentle sawtooth slope is provided. The amplitude of the sawtooth output from fixed amplitude generator 272 is, of course, always the same. Assuming for exemplary purposes that a course error signal is received over conductor 194, indicating the selected course as being to the right of the aircraft heading, (see upper waveform, FIG. 10c), the amplitude of the variable sawtooth output from generator 302 is increased by an amount related to the value of the course error signal, and as a result with the two sawtooths shown in FIGS. 9i, 9j input to subtractor 314, the output will be represented by the upper line of FIG. 10c. With such waveform output the far end of the course centerline will occur later in the line trace (i.e., will be moved to the right of the display center). It is apparent that a signal output from variable sawtooth generator 320 of less amplitude than the fixed amplitude signal (see lower waveform, FIG. 10c) would result in corresponding movement of the far end of the course line to the left of the display center.

NEAR TURN CHANNEL

In a similar manner, a second or "near turn" channel NTC (FIG. 8g) provides a variable sawtooth output to effect lateral displacement of the near end of the path from the reference center position of the display in response to variations in the VOR/LOC displacement signals input over conductor 196. Such circuitry is very similar to the far turn channel circuitry FTC and basically comprises a subtractor amplifier 306 having a first input circuit connected to the VOR/LOC displacement input 196, and a second input connected to the reference voltage source 274. The output of the subtractor operational amplitude 306 is extended over conductor 307 to a variable amplitude sawtooth generator 310, (which is of the same structure as variable amplitude sawtooth generator 302) and also over 308 to a subtractor operational amplifier 312.

Variable sawtooth generator 310 has a further signal input from the horizon line flip-flop 270 (path 271) and an input from the pitch isolation amplifier 276 (path 277). In response to such inputs, generator 310 provides a sawtooth output in the same manner as generator 302, the amplitude of the sawtooth of the near turn generator 310 varying with the VOR/LOC displacement signals received over conductor 196, and the slope being variable for different pitch conditions, so that the sawtooth amplitude will not change with the changing pitch input.

The signal output of the near turn generator 310 is transmitted over conductor 341 to a subtractor operational amplifier 312. A second input circuit 278 to amplifier 312 provides the fixed amplitude sawtooth from generator 272 thereto for reference purposes, and a third input circuit 308 provides signals representative of the VOR/LOC error signals from operational amplifier 306. The basic difference between channels NTC and FTC is the hinge point location. In NTC, the input VOR/LOC signals $E_B-E_N$ is added to the variable sawtooth to effect a DC level shift.

The outputs of the variable sawtooth generator 310, the operational amplifier 306, and the fixed reference sawtooth output from generator 272 are algebraically summed by the subtractor operational amplifier 312 to produce a bi-polar sawtooth, the magnitude of the bi-polar sawtooth being a direct function of the value of the near turn signal error input over conductor 194 (Variable Saw+Near Turn DC)—(Fixed Saw).

With reference to FIGS. 10d, 10e, the range of waveform outputs of the fixed generator 272 and the near turn generator 310 are shown thereat. Briefly the waveform output 278 of fixed generator 272 is shown in FIG. 10a. With zero VOR/LOC displacement signal input, the output of the variable generator 310 will be as shown by the solid line in FIG. 10e which is the same as that of the fixed generator 278 (FIGS. 10d, 10e). With the receipt of a VOR/LOC signal indicating an error in one direction a sawtooth is provided from variable generator 310 as indicated by the dotted line $E_N$ MIN. With receipt of a VOR/LOC signal indicating an error in the other direction, the resultant sawtooth output from variable generator 310 will be as indicated by the dotted line $E_N$ maximum.

As stated above, the sawtooth output of near turn channel NTC is coupled over path 341 to subtractor operational amplifier 312 for referencing to the fixed amplitude sawtooth (FIG. 10d) and the output of subtractor operational amplifier 306 to produce bi-polar sawtooths as shown in FIG. 10f. Zero near turn error is illustrated by $E_N=0$. Error in one direction (minimum) results in a negative going sawtooth and effects displacement of the near end of the course line to the right. Error in the other direction (maximum) results in a positive going sawtooth and displacement of the near end of the course line to the left.

The resultant sawtooth waveform output of the subtractor operational amplifier 312 and the subtractor amplifier 314 are fed to an algebraically summed by adder operational amplifier 315 along with a reference voltage input from source 314, the voltage level output therefrom determining the composite direction of the displacement. The amplitude of the output signal as shown adjacent conductor 317 in FIG. 8h will vary with the amplitudes of the near turn and far turn sawtooths, whereby, as will be shown, the lateral position of the vertical line relative to the vertical display center will be correspondingly adjusted.

If the sawtooths ae of equal amplitude (course error signal equal to VOR/LOC signal) the output will be DC voltage signal (see waveform P adjacent conductor 317).

If the sawtooths are of different amplitudes, the resultant output will be a composite sawtooth, and the course line and runway background will be presented as a skewed line, which when viewed at the vertical frequency will have a shape similar to the composite sawtooth output of amplifier 315. Stated in another manner the point at which the course line crosses the horizon line is determined by the amplitude of the far turn sawtooth and the point at which the course line intersects the line marginal edge of the display is determined by the amplitude of the near turn sawtooth. Together the amplitudes of the sawtooths determine the slope of the course line.

The output of the operational amplifier 315 is fed over conductor 317 to establish a variable reference voltage for the triangle generator pickoff circuits 253 and 320, as initially disclosed and now briefly summarized.

If the amplitudes of the waveforms input to adder 315 are equal as shown by the waveform P adjacent conductor 317 in FIG. 8h, a vertical course centerline will be displayed. That is, the output of adder amplifier 315 will be a DC signal of constant value for the raster trace from the bottom marginal edge to the horizon line, and the generator 320, 253 in the centerline generator CG and runway generators RG will provide a video pulse output over conductors 321 and 254 respectively at the same interval in each horizontal trace below the horizon line, which interval is determined by the time during each line trace that the horizontal sawtooth increases to the value of the DC reference signal on conductor 317 (see FIG. 8f).

The width of the pulse output from voltage comparator 322 may be adjusted by centerline width potentiometer 323 which, in any event, will be less than the width of the pulse output from voltage comparator 255. As noted earlier, the output pulse of voltage comparator 255 becomes decreasingly narrower during progress of the raster trace from the bottom to the horizon by reason of the sawtooth signal input over conductor 282.

The outputs of the voltage comparators 255 and 322 are fed over conductors 256 and 234 respectively to a diode mixer 257 which, as shown, provides a gray level signal for no input, a black level signal for a signal input over conductor 256, and a white level signal for an input over conductor 234. Thus, for a horizontal line trace in which the course line is located in the center of the display (FIG. 3c) with inputs A, B on conductors 234, 256 the waveform output from the diode mixer for one representative raster line will appear as shown adjacent output conductor 258. If this is assumed to be the lower line in the successive line trace advancement from the bottom toward the horizon, the pulse input 356 to the diode mixer 257 will decrease in width (by reason of the vertical sawtooth input to comparator 255 over conductor 282) and the background path will decrease in width as shown in FIG. 3c. The centerline remains at the same width.

In the foregoing example, the signals for generating a vertical course line were illustrated. In the event that the course line is to be skewed from left to right (for example) in the upward trace, the waveform signals RR, CC, will maintain their relative position to each other in time. The signal for the fixed line will occur at a position determined by the value of the near turn error signal and the signals in each successive horizontal line trace will occur at a later time (i.e., will move further to the right of horizontal sync (h) in the illustrated waveform) which shift is effected by the composite near turn, far turn signals provided over conductor 317 to the course line generator CG and the runway generator RG.

COURSE-LINE GATING

With reference now to FIG. 5b, the waveform output from course centerline generator 250 is fed over conductor 258 to one input of an AND gate 259. A second input circuit of AND gate 259 is connected over conductor 390, 391 to a touchdown point waveform which is provided by the touchdown point generator 389, and a third input is connected over conductor 392 to the output of the throttle command generator 267.

Touchdown point generator 389 is operative in a manner similar to that described for FIG. 8f (except the sawtooth occurs at a vertical frequency). During the initial portion of the trace touchdown point generator 389 provides a positive signal output over conductor 390, 391 to the gate CLG. As the touchdown signal occurs the generator provides a negative signal for the successive lines of the raster trace in its progress toward the horizon line. The manner in which the runway is generated is set forth in the description of gates CLG. A pitch signal over conductor 256' from isolation amplifier 276 (FIG. 8g) insures that the touchdown generator 389 output is ground stabilized in pitch and will remain in the same relative position for a given touchdown point input.

The throttle command generator 267 is operative to provide a positive signal output for a predetermined number of lines as determined by the prewired count outputs from binary counter 169 which is advanced from a reset state at the start of each raster by the horizontal sync pulses received over conductor 182 from the timing generator 180. Thus, if so wired, the binary counter 169 will control a flip-flop (not shown) to provide a positive pulse for the first forty counts, and then for a period of five counts to provide a negative pulse. During the period of concurrent positive pulse output by touchdown point generator 389 (raster start to horizon) and throttle command generator 267 (first forty counts), AND gate 259 conducts and the waveform output from course centerline generator 250 over conductor 258 is further fed over AND gate 259 and OR gate 264 to video mixer 214 and video amplifier 168.

With reference to FIG. 3A, the first shaded block which forms the lower near end of the course line is provided by such signals. As the counter 169 is advanced through five more counts, the negative pulses output from the throttle command generator 267 on conductor 390, 391 to inhibit AND gate 259 and the broken path portion immediately above the lower block will occur. Counter 169 is preset to provide negative pulses at spaced intervals in such manner (every forty times for example) to provide the broken course line shown in FIG. 3a.

Movement is provided for the sections which make up the courseline for the purpose of providing throttle command information to the pilot. That is, a throttle command signal is fed over conductor 204 to an astable multivibrator 268 which provides a pulse output of a width determined by the value of the input signal over conductor 204. The multivibrator effects either advancement or decrease of the count on binary counter 169 as determined by the amount of throttle command indicated. By way of example, assuming five counts are added by multivibrator 268 to the counter, it will be apparent that the binary counter will advance to count 40 five lines sooner in a raster trace than it did before, and the broken sections of the path will each occur five lines closer to the bottom. The sections will thereby appear to have dynamic motion in the direction of the bottom of the screen, which motion is used to represent a command to decrease the throttle and thereby to slow the aircraft as dictated by the throttle command display. As the throttle is decreased the signal on conductor 204 decreases the count output of multivibrator 268 and decrease of the courseline motion.

In a similar manner decrease of the count will effect a display of movement toward the horizon, and the pilot will increase the throttle to increase the aircraft speed until the line motion is terminated.

Assuming now that a signal is received over conductor 206 indicating touchdown point is being approached, the touchdown point generator 389 shifts to a negative pulse output over conductor 390 and AND gate 259 is blocked.

Prior to this time the positive pulse output from touchdown generator which enabled AND gate 259 was also transmitted to inverter 266 and the resultant negative pulse inhibited AND gate 262 which is also fed by the inverted output of course center line generator 250 and the output of binary counter 169. At such time in the raster as the pulse output of touchdown generator 389 shifts to a negative pulse, the pulse output from inverter 266 over conductor 394 to AND gate 262 along with the positive pulse over conductor 393 from counter 169 enables AND gate 262, and the output waveform for course centerline 258 as inverted by inverter 260 is passed over AND gate 262 and OR gate 264 to video mixer 214 and video amplifier 168. Since the signal is inverted the previously dark portion (the runway) is now white and the portion which was previously white (the center line) is now dark (see FIG. 3E for example) for the interval beginning with the receipt of the touchdown signal to the horizon.

SAWTOOTH GENERATOR CIRCUITS 302, 310, 372

With reference to FIG. 11, a basic generator circuit SG which may be utilized for the sawtooth generators 302, 310 and 272 of FIG. 8 is set forth thereat in detail. As there shown the sawtooth generator circuit 56 basically comprises an input circuit (275, 307, 301 as the case may be), connected to a differential amplifier 350. A feedback conductor 371 is connected to the second input for the differential amplifier 350 for the purpose of achieving a fixed amplitude output regardless of duty cycle (i.e., period of sawtooth generation). The output voltage of differential amplifier 350 is connected over resistor 351 to the base of transistor 352. The collector of transistor 352 is connected over the resistor 353 to positive potential, and over resistor 354 and diode 355 to the control transistor 360 which controls the current flow over a charging circuit for capacitor 362 which extends from plus potential over resistor 361, transistor 360, capacitor 362 to negative potential.

The level of the signal coupled to differential amplifier 350 (from input 275, 307 or 301 as the case may be) will determine the extent of conductivity of transistor 360 and thereby the basic charge rate for capacitor 362. A second circuit for further controlling the charge rate includes a transistor 365 which is connected with resistor 366 between positive and negative potential and which has a base element connected to the input conductor 277 (FIG. 8g) over which signals indicating the pitch of the aircraft are received. If the aircraft is in a pitch-up attitude (wherein the horizon line will occur at a lower point on the display), the voltage of the signal over input conductor 277 is decreased, and the conductivity of transistor 365 is increased to thereby increase the charge rate over the capacitor 362 with the consequent result that the slope of the sawtooth is increased, and the horizon line is traced at an earlier point in the display (see FIGS. 9e–9g). The changing voltage on capacitor 362 appears as an output signal on conductor 367 for amplification by a buffer amplifier 370 and transmission over the output circuit 278, 341, 303 as the case may be. The discharge of the capacitor to provide the trailing edge of the sawtooth is effected by switch 368 which is turned on in response to a signal input over conductor 271 from the horizon line flip-flop circuit 270 (FIG. 8g). Thus the trailing edge of the sawtooth is tied to the horizon line trace (and the pitch of the aircraft).

In brief, with the receipt of the vertical sync signal at the start of the raster trace, the initial portion of the waveform received over conductor 271 effects turnoff of the transistor 368, and charging of the capacitor 362 occurs at a rate which is basically determined by the value of the signal on the first input conductor (275, 307, or 301 as the case may be) which charging continues until such time as the vertical edge $H_1$ of such waveform occurs on conductor 271, which edge is coincident with the trace of the horizon line on the display.

The rate of charging in addition to being determined by the level of the input signal on conductors 275, 307 or 301 is also determined by the value of the pitch indicating signal on conductor 277 which varies in value with the pitch attitude of the aircraft. At such time as the vertical edge $H_1$ of the waveform output from flip-flop 270 occurs on conductor 271 during the raster trace, the transistor 368 is turned on and capacitor 362 is discharged to provide the trailing edge of the sawtooth.

It will be seen therefore that with a fixed turn input signal on conductors 275, 307, 301, the slope of the outgoing sawtooth is varied with changes in the pitch input signal while yet maintaining a fixed amplitude sawtooth so that the ends of the course centerline retain the same horizontal coordinates relative to the horizon line and bottom marginal edge of the display. With changes in the turn signal input on conductor 301, 307 the amplitude of the sawtooth output from the associated generator is adjusted to correspondingly vary the position of the horizontal coordinate for the near end or far end of the course line as the case may be.

HEADING SCALE GENERATOR

With reference once more to FIG. 5a, a heading scale generator HSG in the video generator 174 generates signals for coupling over conductor 411 to video mixer 214 and conductor 176 to the video amplifier 168 for the purpose of producing a digit-numeric presentation of the aircraft compass heading along the horizon line as shown in FIGS. 3a–3f.

The generator HSG which produces the scale there shown is capable of providing thirty-six such numeric presentations (0–35) at ten degree intervals (10°×36 =360°). The ten-degree intervals are further subdivided into two-degree increments by appropriate index marks which may be derived from the numeric start pulse in the same manner as the numeric segments are generated.

The basic circuitry and operational modes utilized in the generation of the numeric digits are similar to those set forth in the application to Kent Myles Cornell et al. which was filed Oct. 23, 1963, and assigned to the assignee of this invention, particular reference being made to the preset counter techniques which were used in the horizon symbol positioning circuit 48 (FIG. 7) and the video generator 64 (FIG. 2) of such application which techniques will be described briefly hereinafter.

With reference to FIG. 5a a digital input is received over heading conductor 192 which represents the heading of the aircraft at all times. In one embodiment a three wire synchro provides a representation of the heading as the input signal, and an interface adapter unit including a servo repeater system comprising a control transformer and amplifier with feedback is operative so that the shaft of the control transformer is rotated through an angle which corresponds to the heading angle. A shaft position encoder is ganged to the control transformer shaft so that the shaft is also rotated through the heading angle. Internal to the encoder is a code disc ganged to the shaft which is comprised of a series of tracks, (one per bit) which are symmetrically divided into conducting and nonconducting areas. The length of these areas on any given track is the function of the weighting of the bit (track) position. The shaft angle is uniquely defined in binary form (to a resolution commensurate with the number of tracks on the disc) by obtaining an electrical signal from each track via internally contained brushes in contact with conducting or nonconducting areas on each track. Thus an electrical signal is available in bit parallel form (one per brush) which defines the heading. Since this is one of many suitable methods of converting the heading indications of the aircraft to digital signals a detailed showing of such structure is not believed to be required.

With reference to FIG. 3a, for example, it will be seen that the heading range in the display extends over 41.33 degrees, each horizontal trace being divided into 248 segments, whereby each segment represents ⅙ of a degree, and the total line trace corresponds to 248×⅙ or 41.33 degrees. In the present embodiment, wherein each degree is represented by six bits, there will be 6×360° or 2160 bits.

Thus it will be necessary to provide a counter 404 which is capable of counting from zero through 2159 in binary form (eleven stages). However, since only 248 counts exist in each horizontal trace, the counter 404 will be preset to the first one of the numbers in the particular range of numbers which is to be reproduced on the display, and during the line trace the counter will advance 248 counts as the clock pulses are received over conductor 185 from the timer generator 180.

Thus in the example of FIG. 3a, the first display number is "09" and the counter must be advanced so that the count for such display number occurs in the raster line trace. For this purpose the digital signals representative of the aircraft heading (107 in FIG. 3a) are fed over conductor 192 to the preset gate 402 over conductor set 403 for registration in the preset counter 404 by the horizontal sync signal 183. The preset counters 404 will therefore always contain a count which is representative of the aircraft heading at any given time.

Clock pulses CP are transmitted over conductor 185 by timer generator 180 at the rate of 248 pulses per line trace. At the end of each line, the preset counter 404 is reset by the horizontal sync signal on conductor 182 to the count provided by the preset gate 402. Thus, the specific 41.33 degrees in the 0–360 degree range to be displayed in a line trace is basically determined by the input signal 192 and gates 402 in their initial setting of counter 404.

The coordinate transformation effected is achieved in the manner set forth in more detail in the above identified application, particular reference being made to the preset counter 609 of such application and the preset gates 611, 615 shown therein. Briefly, in effecting display of each of the thirty-six digit sets of heading (i.e., 00, 01, 02 . . . 34, 35) it is necessary to provide a discrete pulse which indicates the time of generation for such numeric pair. Thus thirty-six separate pulses are decoded from the counter by thirty-six decoding gates 358 in the manner similar to gates 611, 615 of the above identified application. As there shown, each decoding gate is wired to operate at, and only at, a specific one of the counter outputs. In further defining the gate inputs a coordinate transformation of 119 counts is inserted so that the heading inserted in the counter 404 will occur at the center of the display. Such transformation is reached by dividing the counts in a line by two (248/2) and counting five counts back (each numeric pair is nine counts wide), whereby the center of the numeric pair coincides with the correct count.

For example, the "00" degree gate will be wired to operate at the binary count which represents count 119. Assuming the signal on heading conductor 192 indicates an aircraft heading of zero, the preset gates 402 will mark 00000000000 on the preset counter 404 and as the preset counter 404 advances from zero to binary 247 as a result of the clock pulses input over conductor 185 during each horizontal trace of the raster, the ones of the decoding gates 406 which are wired to operate during the binary counter 0–247 will provide pulses which activate the numeric generator 410 to provide waveform outputs to effect the desired numeric display in a manner which is described more fully hereinbelow. Moreover, with a 119 count coordinate transformation wired into each decoding gate 406 the actual heading of the aircraft will always be displayed at the screen center. Thus with the aircraft heading reading zero, and the "zero" gate wired to operate at count 119, it is apparent that the line trace will advance to five counts before screen center (124 counts) before effecting the display of the zero heading.

It is further evident that during any line trace (248 count sequences) four decoding gates will be operative (60 counts for each 10 degrees). As a result, with 00 in the center, the decoding gate for 35 (count 59), 01 (count 179) and 02 (count 239) will also be enabled.

The manner in which the numeric generator 410 is controlled by enablement of decoding gates 406 and control logic gates 408 to effect numerical generation is now briefly set forth. In the present embodiment, a single numeric generator 410 is used which operates to generate a digit matrix wherein two digits may be defined. The representative matrix provided by the single numeric generator 410 is shown in FIG. 12a. As there shown, it basically comprises a background trace, fourteen matrix segments and a set of degree index markings thereunder. The matrix generator may be similar to the video generator 64 set forth in the above identified application in that it includes a horizontal counter *hc* activated by a horizontal position pulse from the decoder gates 406 (i.e., the horizontal coordinate of the raster position at which the numeric is to occur) and a vertical counter *vc* activated by a vertical position pulse from generator 210′. The decoder gate 406 (which basically comprises AND gates) determines in response to the output of counter 404 the two numerics to be displayed. Control logic gates 408 include a gate for each segment 1–14 in the matrix. When two numerics are to be displayed the appropriate ones of the segments which make up such numerics on the display are energized in response to the signal from decoding gates 406 indicating the desired numerics. As the horizontal and vertical counter *hc* and *vc* are energized for the matrix trace only those segments identified by the gates 408 are displayed.

Considering the representative examples of FIGS. 12b–12d, any number from 00 through 99 can be displayed by turning on appropriate ones of the matrix segments 1–14 while all others are inhibited.

By way of brief example, the following chart indicates the displays for which the segment one of the fourteen segments must be turned on by the prewired control logic gates 408.

SEGMENT 1

| Numeric displayed | Condition | | 1 | 1 |
|---|---|---|---|---|
| 00 | ON | 10 OFF | 20 ON | 30 ON. |
| 01 | ON | 11 OFF | 21 ON | 31 ON. |
| 02 | ON | 12 OFF | 22 ON | 32 ON. |
| 03 | ON | 13 OFF | 23 ON | 33 ON. |
| 04 | ON | 14 OFF | 24 ON | 34 ON. |
| 05 | ON | 15 OFF | 25 ON | 35 ON. |
| 06 | ON | 16 OFF | 26 ON | |
| 07 | ON | 17 OFF | 27 ON | |
| 08 | ON | 18 OFF | 28 ON | |
| 09 | ON | 19 OFF | 29 ON | |
| (See FIG. 12a) | | (See Fig. 12b) | (See Fig. 12c) | (See Fig. 12d) |

In further explanation of this chart, the control logic gate for segment 1 of the fourteen gates in group 408 (there is one gate for each segment) will be wired to OR the pulse output corresponding to 100° through 190°— (10–19 in the chart above). Should any of these pulses occur output from the decoding gate 406, the flip-flop which controls segment 1 will inhibit segment 1 by an AND gate operation. For the occurrence of any of the other pulses, segment 1 flip-flop will not be inhibited, and will allow the segment to be displayed.

It is noted that the system is further enhanced by the ease of repetition of the heading scale on any or all of the major pitch lines by merely triggering the numeric generator with the vertical position pulses from the pitch line generators. Thus the pilot has available an earth stabilized compass display at any aircraft pitch attitude.

COMPASS COMPARATOR

The video generator circuitry (FIG. 5a) also includes a compass comparator generator 415 which compares the heading signal on conductor 192, which is obtained from the captain's compass, with the heading signal provided over conductor 198, which is obtained from the copilot compass, the difference between the two signals being a direct current signal, plus or minus value, which effects relative horizontal displacement of generation of the two marks 86, 88 (FIG. 3a) normally generated at the same horizontal coordinate (but different vertical coordinates) by compass comparator generator 415.

In the embodiment shown separate horizontal and vertical counters 480, 481 are responsive to the clock pulses and horizontal sync pulses respectively to advance during each raster trace. As a predetermined count is reached by the vertical counter indicating the desired line of display on the fixed symbol, decode gates 486 provide a pulse to AND gate 484 for that line (and seven successive lines). As the horizontal counter 480 advances to the count representing the desired lateral position of the symbol an output pulse is provided to the second input for AND gate 484 for a period related to the desired width of the symbol. With pulses on both inputs to AND gate 484, a pulse is provided over OR gate 495 and conductor 417 to the video mixer 214 to provide the fixed lower symbol 88 on the display. As the vertical counter advances to the lower line selected for the symbol 86, decode gate 488 provides a pulse over conductor 489 to AND gate 490. The DC signals input over conductors 192 and 198 are subtracted in an operational amplifier 491 and the difference or error signal (plus or minus) is coupled to a voltage comparator 493 for referencing relative to a horizontal sawtooth obtained from timer generator 180. If there is zero error signal the comparator 493 provides an output pulse as the horizontal trace advances to a position in vertical alignment with fixed symbol 88. With an error signal the time of occurrence of symbol 86 is adjusted to the left or right in the manner described earlier with reference to FIG. 8*f* by reason of the different time of pulse input to AND gate 490. The output of AND gate 490 is provided over OR gate 495 to conductor 417 and video mixer 214.

GLIDE SLOPE

Glide slope scale generator 422 provides signals which present the glide slope scale 89 on the display (FIG. 3*a*) in substantially the same manner as the compass comparator fixed symbol 88 with slight obvious differences in the decoder gate wiring. Inputs include pulses over the horizontal sync conductor 182, vertical sync conductor 184 and the clock pulses 185. The output signals from glide slope scale generator 422 which occur at the time in the raster prewired into the decoding gates are fed over conductor 423 to the video mixer 214.

A glide slope pointer generator 420 generates a pointer 91 for positioning adjacent scale 89. The pointer symbol 91 is produced by pulse fixed in time relative to the raster trace which is provided over conductor 421 by the horizontal counter in the glide slope scale generator 422 (i.e., similar to counter 480 in the compass comparator 415) as "ANDED" with a vertical pulse output from a voltage comparator (i.e., such as comparator 493 used in the compass comparator). Deviation signals input over conductor 202 are fed to the voltage comparator for referencing to the vertical sawtooth. As described above, glide slope deviation signals received over conductor 202 thereat effect adjustment of the bar 91 vertically on the display to correspondingly different positions adjacent the glide slope scale 89.

RADAR SCALE GENERATOR

Radar scale generator 424 basically comprises a radar ribbon generator 428 which provides a line having white portions and dark portions, the length of the dark portion being adjusted with variations in the altitude of the aircraft as represented by input signals over conductor 200 from the radar equipment which indicate the aircraft altitude. The output of the signals from the radar ribbon generator 424 are fed over conductor 431 to the video mixer for display purposes.

The entire ribbon 84 is obviously generated by the same circuit arrangement as used to generate the compass comparator markers, the decoding gates being wired to provide output pulses for an increased number of lines. The darkened portion is provided by comparing radar altitude signal input over conductor 200 with the vertical sawtooth input over conductor V*s* by means of a comparator circuit such as 493 used in the compass comparator circuit 415. It is apparent that in less sophisticated versions, the ribbon may be used alone. However, if desired numeric presentations may be included in the manner shown in FIG. 3*a*.

In such event a numeric generator 430 is operative in the manner of the numeric generator of the heading scale generator HSG but is operative, however, to provide fixed position numerics rather than movable numerics as in the case of the azimuth heading circuitry. The radar numeric generator 430 is controlled by signals from the timing generator 180 including vertical sync signals received over conductor 184, horizontal sync signals received over conductor 182 and clock pulses provided over conductor 185. Appropriate fixed counts during the vertical and horizontal traces are logically decoded and combined to produce the segments of the fixed numerics. The output of the numeric generator 430 is fed over conductor 431 to the video mixer 214.

Course deviation scale generator 50 produces signals which provide the deviation scale 74 on the raster. Since the scale is fixed the manner of generation will be obvious from the foregoing description of the compass comparator fixed marker 88. The roll pointer 64 is also fixed and is generated in a similar manner. The roll scale 62 may be painted on the screen face.

OUTPUT OF VIDEO GENERATOR 174

As shown in FIG. 5*a*, the output of the video mixer 214 is fed over conductor 176 to video amplifier 168 and thereafter to the electron beam gun of the cathode-ray tube 167. As was previously noted, the cues or symbols provided by the signal output from video generator 168 are rotated on the display as a set with displacement of the aircraft about the roll axes, such manner of rotation being effected by mounting the deflection yoke 173 (FIG. 4) of the cathode-ray tube 167 for rotation about the neck thereof by a roll servo 172. Orientation of these same display symbols on the display for different conditions of pitch and heading is, of course, provided by reason of the variable signals input to the video generator 174 as described above.

COMMAND SYMBOL GENERATION

In addition to the symbology and displays described above, the novel invention also provides a display of command information in the form of an independently movable symbol 58 (an inverted T in the present example) to the pilot for use in maneuvering of the aircraft. In flight, the plane is maneuvered so that the fixed reticle 56 on the display is adjusted into overlay relation with the flight command symbol 58. With a display such as shown in FIG. 3*a*, for example, the pilot would bank the craft to the right and increase the pitch of the aircraft to bring the fixed reticle symbol 56 into superposed registration with the flight command symbol 58. It will be immediately apparent that in such use, it will be necessary to adjust the symbol to various coordinate positions and various angles of rotation independent of the basic background display. Similarly, the basic symbology must be adjusted to different positions of bank, pitch and heading independent of motion imparted to the command symbol.

Stated in another manner the command information is presented to the pilot in superposed relation to the horizontal situation display so that the pilot may intelligently monitor the command in terms of his position relative to a selected course.

In many instances, it is highly desirable in the showing of command information to provide a symbol such as 58 which is brighter and has a finer line structure than can be generated with the raster scan. To achieve such presentation in the present application, stroke writing (also known as a calligraphic presentation) is utilized in the provision of the aircraft symbol. However, while having such advantage in the presentation of a symbol the calligraphic presentations generally are inadequate to portray shades of gray or pictorial information. It has been discovered that the combination of these types of presentations can have the advantages of both techniques; that is, a combined display which has a background raster for gray shade, pictorial information, and stroke writing for fine line symbols incorporate the advantages of both. Additionally, by providing the separate generating modes for the two different sets of information, each of the different information sets can be "rolled" independent of the other. That is, the raster can be rolled by rolling the deflection yoke while the waveform for the stroke written symbols may be resolved and counter-rolled so that they remain stationary, if desired, or alternatively the stroke written symbols may be rolled by resolving without rolling the raster. Finally, both the stroke written and the raster drawn symbols may be rolled together. This freedom in a display permits considerably more versatility in the presentation of certain types of information which is not independently available when only one of these two forms of generation is used. The particular circuitry shown in block in FIG. 4 and in more detail in FIG. 6 effectively combines raster scanning and line writing presentation in the same display.

Fundamentally, such presentation is accomplished by stopping the horizontal deflection of the electron beam during vertical blanking, and effecting line writing by the beam with the X and Y deflection during this period. In other words, the normal raster horizontal drive is inhibited to stop the raster horizontal sweep. Since the coil associated with this sweep drive is of low inductance for high efficiency and sweep, it cannot be driven calligraphically without consuming an impractically large amount of power. Therefore, a separate horizontal coil with a much higher inductance is built into the deflection yoke. This coil is used during the calligraphic writing period for the horizontal or X deflection and the current in such use is held at zero during the raster time. The vertical coil impedance, working with the slower vertical raster scan, can be high enough to be compatible with the calligraphic system so that only one coil is provided.

RASTER GENERATION AND DISPLAY

The electron beam of the cathode-ray tube 167 is swept in the horizontal direction at the rate of 15,750 c.p.s. by horizontal sawtooth waveforms on conductor 182 and is moved vertically by vertical sawtooth on conductor 184 at a field rate of 60 c.p.s., whereby an interlaced raster consisting of 262½ horizontal lines for a vertical field is provided (one field every 16.6 milliseconds). The waveform required to deflect the electron beam in the horizontal and vertical direction consists of either a voltage or current sawtooth waveform depending upon whether the cathode-ray tube 167 is electrostatic or magnetic deflection. If an electromagnetic system is used, the sawtooth waveform can be approximated by $I=At+C$ where I equals the current flowing through the deflection coil, A equals the ratio of the amplitude of the sawtooth to the active scan time, C is a constant which is a function of the raster centering. If electrostatic deflection is used the sawtooth can be aproximated by $V=At+C$ where V equals voltage impressed across the deflection plates, $t$ equals active scan time (exclusive of retrace time) and C is a constant which is a function of raster centering.

As shown in FIG. 6, two deflection coils 173h and 173h' are used to deflect the beam. Horizontal sync pulses are provided at the rate of 15,750 c.p.s. over conductor 182 by timing generator 180 (FIG. 5) to AND gate 380 which normally has a sweep hold signal connected to a second input, so that the sync pulses are passed to drive a horizontal sweep generator 382 which in turn provides a sawtooth deflection waveform to deflection yoke 137h to effect the trace of the horizontal line across the raster in response to the occurrence of each horizontal sync pulse. Vertical sync pulses 184 provided over conductor 184 drive the vertical sweep generator 384 in the provision of a vertical sawtooth deflection waveform, at the rate of sixty cycles per second, to the diode mixer 386 and thereby over deflection amplifier 388 to the vertical deflection yoke 173v. The cathode-ray beam as thus deflected provides a raster trace on the face of the cathode-ray tube 167 which is modulated by the input signals coupled over conductor 177 from video amplifier 168 for the video generator (FIG. 5) and the signals output from video generator 174 and video amplifier 168 as described herebefore provide the basic display (with the exception of the flight command symbol 58) on the raster.

The sawtooth deflection waveforms (horizontal and vertical) for providing the raster, are characterized by an active sweep time followed by an inactive sweep time or retrace time. The active sweep time in the case of the horizontal sawtooth wave is that time required to deflect the beam while painting a raster line, and the inactive time is that time required to retrace the beam to its starting point. During the inactive time the electron beam of the cathode-ray tube is normally turned off by the blanking signals output for timer generator 180. The conventional horizontal raster scan sawtooth waveform will usually contain fifty-two microseconds of active time and about twelve microseconds of retrace or inactive time. The vertical sawtooth contains approximately 15.87 milliseconds of active time and .8 millisecond of inactive time. Further the horizontal sawtooth retraces approximately 262 times for each trace of the vertical deflection sawtooth. The foregoing exemplary values are typical of sweep times experienced in a conventional television set.

In order to implement the combination of raster and calligraphic scan techniques, it is necessary to inhibit the sawtooth waveforms into the vertical deflection coil 173v and the horizontal deflection coil 173h immediately after each raster trace, and before the start of the next vertical trace, so that the appropriate calligraphic waveform may be inserted in both the vertical and horizontal deflection channels to effect the trace of the command symbol 58 on the face of the cathode-ray tube. Additionally, the timing generator 180 must be controlled to unblank the electron beam during the time the beam is being moved in the trace of the symbol generated by the calligraphic deflection waveform.

A sweep hold pulse is introduced into the horizontal and vertical deflection circuits over conductor 186 upon completion of each vertical field and the electron beam is unblanked for a period necessary to achieve writing of the symbol. During the period that the sweep hold pulse is provided over conductor 186, calligraphic waveforms are algebraically added to the raster scan waveforms. In the trace of the command symbol shown in FIG. 7a for example the waveforms of FIGS. 7b–7g will be provided. The vertical sweep waveform output from the vertical sweep generator 384 is shown in FIG. 7b, it being apparent that the active raster time occurs during the period of the increasing slope of the sawtooth, and the retrace time occurs immediately thereafter. During retrace, timing generator 180 provides a sweep hold pulse (shown in FIG. 7c) over conductor 186 to the inverter 390 (FIG. 6) and the sweep hold pulse output therefrom to AND gate 380 inhibits operation of the horizontal sweep generator 382 during the period of the sweep hold pulse. The sweep hold period is expanded in the subsequent waveform illustrations 7d–7g to more clearly illustrate the symbol trace which is generated during such period as now described.

FLIGHT COMMAND GENERATOR 160

The flight command symbol generator 160 basically comprises an X waveform generator 392 which is operative as enabled to provide the waveform output shown in FIG. 7e, and a Y waveform generator 394 which is operative as enabled to provide the waveform output shown in FIG. 7d. The duration of the two output pulses of FIG. 7d, 7e is related to the sweep hold pulse 186 as referenced by the dotted lines to the waveform of FIG. 7c. The waveform generators 392, 394 are triggered in their operation in response to the receipt of the leading edge of the sweep hold pulse over input circuit 186 to provide the waveform output, the illustrated changes in the waveform being controlled by clock pulses fed over a second input conductor 185 (CP) by the timing generator 180 to associated counters (not shown) which control gates in the waveform modification at preset count. A third input conductor 150 to X waveform generator 392 provides DC signals of variable values which are indicative of the yaw command to be displayed by effecting lateral displacement of the symbol on the display. A third input 146 to Y waveform generator 394 provides DC input signals of variable values to indicate different pitch commands for the aircraft, and to thereby effect corresponding variation in the vertical positioning of the flight control symbol 58. The pitch command DC input 146, for example, is added to the DC level of the Y waveform of FIG. 7d. This DC addition is constant for the period of the sweep hold pulse and thereby effects a corresponding vertical displacement of the entire flight command symbol. The yaw command signal over conductor 150 is added to the DC level of the X waveform in a similar manner.

The resultant output signals generated by the X, Y generators 392 and 394 are coupled over output conductors 393 and 395 to command roll resolver module 162 for mixing with the roll command signal provided over conductor 138.

With reference to FIG. 7e which shows the X waveform provided output from the waveform generator 392, and the unblanking signal (FIG. 7f), the interval AB of the waveform will effect adjustment of the beam (prior to symbol unblanking) to the horizontal coordinate for the position at which the initial left-hand lower line of the symbol is to be traced. As the gun is unblanked by the symbol unblanking pulse (UBI—FIG. 7f), the increasing waveform BC (FIG. 7e) applied to the horizontal deflection coil 173h' effects lateral movement of the beam across the screen for the interval BC to draw the lower line of the inverted T on the display. The dotted line in FIG. 7e indicates the display center of the raster, and it will be apparent therefrom that the bottom line of the symbol 58 (FIG. 7a) will extend to either side of the vertical center of the display.

During the period CD (FIG. 7e) a second blanking signal B2 (FIG. 7f) is fed to the electron gun of the tube, and the beam is readjusted to the display center by a corresponding decrease in the value of the X waveform, which is maintained at such level during the remaining period of the trace (DE). During this later interval DE, the vertical line of the symbol is traced by reason of the Y waveform as will be described. Subsequent to the tracing of the vertical portion of the symbol (interval DE) a further blanking signal B3 (FIG. 7f) is provided, and the X waveform is decreased (EF) to return the beam to the left hand margin of the display.

With reference to the time related Y waveform shown in FIG. 7d, as the leading edge hold pulse 186 initiates symbol generation by waveform generator 394 and during the first period of the symbol blanking B1 (FIG. 7f) the value of the waveform AB (FIG. 7d) is increased to a value determined by the input pitch signal which value as shown in FIG. 7d will move the beam vertically half way between the bottom and top edges of the display. During the interval BC the X waveform is causing the beam to move to the right from the initial X coordinate, and the Y waveform remains at a fixed level (i.e., so that the beam moves horizontally to trace the lower line of the inverted T symbol). After the period B2 of symbol blanking and movement of the beam back to the lateral center of the display symbol (interval CD of the X waveform), the sawtooth DE (FIG. 7d) is applied to the vertical deflection coil to move the beam vertically during the unblanking period UB2 and thereby effect the trace of the veritcal portion of the command symbol 58 on the display. With the vertical portion of the symbol traced, the further symbol blanking signal B3 occurs and the Y waveform is decreased in value (period EF) to return the beam to the lower marginal edge of the display. The X and Y waveforms have now returned the beam to the lower left hand marginal edge of the display for use in the next raster trace. (It was assumed in the foregoing description that the raster trace is from the bottom marginal edge towards the top marginal edge of the screen.)

As noted heretofore the symbol is displaced (a) vertically to different positions for the purpose of providing pitch-up and pitch-down commands, (b) laterally to different positions for the purpose of indicating heading and yaw commands, (c) and is angularly displaced to provide bank commands.

The pitch-up and pitch-down commands are provided over conductor 146 to Y generator 394 which effects a corresponding change in the DC level (the slope AB of the Y waveform remains the same) so that the trace of the symbol will be initiated at a correspondingly different Y coordinate, (i.e., increased DC level to raise the symbol position on the display and a decreased DC level to lower the symbol position on the display).

In a similar manner heading or yaw commands are provided over path 150 to X waveform generator 392 to effect a corresponding change in the DC level AB of the X waveform (FIG. 7e) so that the trace of the symbol will be initiated at a correspondingly different X coordinate (increased DC level moves the symbol to the right of center and decreased DC level moves the symbol to the left center).

Roll commands for the symbol are fed over roll command path 138 to the command roll resolver module 162 which may comprise a sine-cosine control arrangement. With reference to FIG. 6b command roll resolve module 162 is thereshown in more detail as comprising a synchro differential 525 (which may be of the type shown in "Basic Feedback Control Systems Design," Savant, published by McGraw-Hill 1598, p. 253), having one input connected to roll command conductor 138 and the second input connected to roll conductor 170. The shaft 526 of synchro differential is adjusted to a position related to the difference of the input signals on conductors 138, 170.

A sine-cosine potentiometer 527 has a first and a second arm 528, 529 displaced 90° which are driven by shaft 526 across the potentiometer resistance member 52. The Y waveform on conductor 395 (FIG. 6) is fed to one tap 545 and over phase inverter 542, conductor 543 to a second tap 546 displaced 180° from tap 545 ($Y_1$—Y inputs to pot. 527). The X waveform on conductor 393 is fed over conductor 530 to tap 547 (displaced 90° from taps 546 and 545) and over conductor 549, inverter 550, conductor 552 to tap displaced 180° from tap 547 ($X_1$—X inputs to pot. 527).

The X, Y output conductors 396, 396' are connected to the wipers 528, 529 respectively. It is thus apparent that the Y waveform is modified so as to introduce roll of the symbol about its center (the point of intersection of the horizontal and vertical symbol lines) by an amount related to the input signal on conductor 395. The modified Y signals are coupled over diode mixer 386 and deflection amplifier 388 to the deflection yoke 173v. The waveform output on conductor 393 from the X waveform generator 392 is likewise modified to reflect the roll command input to resolver module 162 and is fed over conductor 396 for ANDING by gate 381 during the sweep hold pulse to deflection amplifier 398 and the separate horizontal deflection coil 173h'. Thus the angle to which the waveforms are resolved is the difference between command roll and actual roll.

It has been further discovered that a different symbol can be traced in each alternate vertical blanking period, whereby the number of symbols which would normally be available in a calligraphic presentation is doubled. The quantity of calligraphic symbols which can then be presented will be limited only to the band pass width of the deflection circuits and/or the brightness required of the display.

Thus, with reference to FIG. 6a the X, Y generators 392, 394 will be the same as shown in FIG. 6. A second set of generators $X'_2$, $Y'_2$ (392', 394') are built to generate the $X_2$, $Y_2$ waveforms for the second symbol to be presented.

A flip-flop circuit 509 having a first input connected to the vertical sync conductor V provides a Q output to gates 510, 514 and a $\bar{Q}$ output to gates 512, 516. The outputs of gates 510, 512 are connected over OR gate 518 to Y waveform conductor 395, and the outputs of AND gate 514, 516 are connected over OR gate 520 to X conductor 393.

In operation, when flip-flop 509 is in one state (Q positive) gates 510, 514 are conditioned to AND the $X_1$, $Y_1$ outputs of the first generator set 392, 394 over OR gates 518, 520 to conductor 395, 393. AND gates 512, 516 are inhibited by $\bar{Q}$. At the start of the next raster trace, the vertical sync signal shifts the flip-flop 509 and $\bar{Q}$ becomes positive to condition AND gates 512, 516 to transmit the waveform output of the second generator set $X'_2$, $Y'_2$ over OR gates 518, 520 to conductors 395, 393. It is apparent that such arrangement results in the trace of different symbols in alternate raster traces.

ELECTRONICALLY GENERATED ROTATING SYMBOLS

An alternative arrangement for effecting symbol rotation is set forth in FIGS. 13 and 14, the arrangement there shown comprising a novel apparatus and method for electronically rotating a TV type video symbol on the raster independent of rotation of the raster. As will be shown, the novel circuitry specifically set forth in FIG. 14 is, for purposes of simplicity, set forth with reference to the manner in which a single line is rotated through 360 degrees about a rotation point at any desired location on the raster. It will be apparent therefrom as to how a variety of symbols of any desired size and shape may be controlled in a similar manner.

With reference first to FIG. 13a, there is shown thereat a sawtooth waveform which is provided at the horizontal rate of the raster (15,750 lines per second in a conventional system). FIG. 13b illustrates the sawtooth which is to be provided at the vertical rate in combination therewith to effect the generation of the particular display presentations set forth in FIG. 13c. As will be apparent from a review of the successive displays in FIG. 13c the waveforms shown in FIGS. 13a, 13b, produce a line on the monitor that is rotated clockwise to 360 degrees.

With reference to FIG. 13, the waveform signals of FIGS. 13a, 13b are provided by a horizontal channel HC and vertical channel VC for coupling to a differential amplifier 464, the output of which is fed to gate 466 whose output is a triangle waveform at the raster rate. This triangle is biased to produce the desired symbol width and amplified sufficiently to produce either a black or white video signal for coupling over amplifier 468 and video amplifier 168 to the input circuit for the electron gun of a cathode ray tube.

The input to the horizontal channel HC and vertical channel VC includes a roll command signal which is provided over conductor 138 (FIG. 4) to indicate the desired roll attitude of the aircraft. The roll signal provided over conductor 138 is fed to a roll demodulator 410 which may consist of a sine-cosine potentiometer driven by a servo system (or a suitable electronic circuit) which converts the input to a DC voltage in the form of ($K1+K2$ sine $\theta$) where K1 and K2 are constants and $\theta$ is the roll angle in degrees. The roll demodulator 410 additionally provides a zero degree roll reference signal K1 on the output circuit 414.

The demodulated roll signal ($K1+K2$ sine $\theta$) is applied over conductor 416 to the input of variable horizontal sawtooth generator 418 and also over conductor 417 to one input of an operational amplifier 428. The zero degree reference signal K1 output over conductor 414 is conducted to the input of the fixed horizontal sawtooth 416 and also over conductor 419 to the second input of operational amplifier 428. The zero degree roll reference signal K1 provides a bias which determines the amplitude of the sawtooth generated by the fixed horizontal sawtooth generator 416, whereas the demodulated roll signal provided over conductor 416 determines the amplitude of the signal output from the variable horizontal sawtooth generator 418. The outputs of the two sawtooth generators 416, 418 are extended over conductors 420, 422 to the operational amplifier 424. The fixed sawtooth is applied to the inverting input of the operational amplifier 424 and the variable sawtooth is applied to the noninverting input of the amplifier 424. The operational amplifier 424 algebraically adds the two sawtooth waveforms for coupling over conductor 426 and mixing network 431 to the operational amplifier 436.

When the input amplitudes from the fixed horizontal sawtooth 416 and variable horizontal sawtooth 418 to the amplifier 424 are equal the output of the operational amplifier 424 is zero, (FIG. 13a, Examples 3 and 7). Variable sawtooth input amplitudes above and below the amplitude of the fixed horizontal sawtooth output from generator 416 result in bi-polar sawtooths starting at zero volts at the output of amplifier 424. FIG. 13a, Examples 1 and 2, are representative of outputs when the variable sawtooth 418 is smaller than the fixed sawtooth 416; Examples 4, 5, 6 are representative of signals output when the variable horizontal sawtooth 418 has a larger amplitude than the fixed horizontal sawtooth 416.

The demodulated roll signal output from the roll demodulator 410 is also applied over conductor 416 and 417 to the operational amplifier 428, and the zero degree reference signal K1 output is applied over conductor 414, 415 and 419 to the second input of the operational amplifier 428. The purpose of the operational amplifier 428 is to produce a negative DC voltage output when the bi-polar sawtooth output from amplifier 424 is positive-going and a positive DC voltage when the sawtooth output from amplifier 424 is negative-going.

The DC signal output from amplifier 428 is extended over mixer circuit 431 to the operational amp 436. This DC signal when added with the bi-polar sawtooth produces a bi-polar sawtooth crossing zero volts at time T1. The gain of operational amplifier 428 is set to be one-half the gain of operational amplifier 424 to produce a line rotating about the center of the monitor. A horizontal pivot point adjustment 431 effects adjustment of the horizontal pivot point to different positions on the raster.

A pitch command signal over conductor 146 may be introduced to effect vertical adjustment of the symbol with changing pitch conditions. That is, as shown, an input command signal is provided over conductor 146 to pitch demodulator 440 which provides a DC signal over conductor 441 to amplifier 443 and mixing resistor 447 for mixing with the output of the operational amplifiers 424, 428 prior to coupling to amplifier 436. Such signal will cause the line to rotate at a pivot point which is displaced vertically from the original rotation point by a distance related to the value of the pitch signal.

The vertical channel VC is of similar structure to the horizontal channel HC. One input of the fixed vertical sawtooth generator 448 in the vertical channel is fed by the zero degree reference signal K1 output from roll demodulator 410 over conductor 414, 415, 445. The variable vertical sawtooth generator 452 is fed by a demodulated roll DC voltage ($K1+K2$ cosine $\theta$) where K1 and K2 are constants and $\theta$ is a roll angle in degrees, such signal being provided over conductor 450 to the variable vertical sawtooth generator 452.

The outputs of the generator 448, 452 are algebraically added in operational amplifier 454 and extended over resistor 456 in mixing circuit 455 to the operational amplifier 462. As in the horizontal channel HC, an operational amplifier 458 has a first input connected over conductors 414, 415 from the zero degree reference signal K1, and a second input connected over conductor 450 from the output of the roll demodulator 410. The amplifier 458 is operative to provide a negative DC signal when the bi-polar sawtooth output of amplifier 454 is positive-going, and a positive-DC voltage output when the bi-polar sawtooth output from amplifier 454 is negative-going. A DC reference signal provided over resistor 460 is added with the bi-polar sawtooth output from amplifier 454 and applied to the second input of the amplifier 462.

The outputs of the differential amplifier 464 are fed to gate 466 whose output is a triangular waveform at the raster rate. The triangle is biased to produce the desired symbol width and amplified sufficiently by amplifier 468 to produce either black or white video when applied to video amplifier 168.

The point around which the line rotates may be changed by adjustment of the gain of the horizontal and vertical operational amplifiers 428 and 458 respectively, the adjustment circuits 431', 433 being provided in the respective channel for such purposes.

What is claimed is:

1. In a system having display means for presenting command, horizontal situation and actual attitude information in an integrated display for an aircraft including a command signal generator means for providing a command symbol on said display means including input means for providing command signals to effect vertical and lateral displacement and roll of said symbol for command purposes, attitude generator means for providing at least a horizon for indicating the actual pitch and bank of the aircraft on the display for reference purposes, means for selecting a desired course, and course line generator means for providing a line symbol on the same display to indicate the horizontal situation of the aircraft, including the displacement of the aircraft from a selected course and the difference between the actual heading of the aircraft and a selected heading, along with the actual and command attitudes.

2. A system as set forth in claim 1 in which said command signals provided by said input means include decrab signals provided to said command symbol generator means during the landing mode.

3. A system as set forth in claim 1 which includes input means for controlling said course line generator means to displace the other end of said line symbol to indicate VOR/LOC displacement of the aircraft.

4. A system as set forth in claim 1 which includes means for providing a glide slope scale, and an indicator adjustable relative to said scale to indicate deviation from glide slope.

5. A system as set forth in claim 1 which includes means for electronically generating a radar altitude scale, and an indicator adjustable relative to said radar altitude scale to indicate aircraft altitude.

6. A system as set forth in claim 1 which includes means for dividing said line into segments, input means for providing throttle command signals, and means for imparting motion to said segments in a direction indicated by the throttle command signals.

7. A system as set forth in claim 1 which includes input means for providing a touchdown area signal, and runway generator means for providing a runway which is first displayed at said horizon line with receipt of said touchdown signal, and which advances along said line symbol as the aircraft approaches the touchdown area.

8. In a system having display means for presenting horizontal situation and command information on an integrated display for a mobile unit having motion about several axes, command signal generator means for electronically generating a command symbol on said display indicating a desired attitude motion for the unit about such axes including input means for providing command signals to said generator means which effect vertical and lateral displacement and roll of the symbol on the display, means for selecting a desired course of movement of the mobile unit, and course line means for electronically generating a further symbol and a course line symbol on the same display with said command symbol for indicating the horizontal situation of the mobile unit, including the displacement of the unit from a selected course and the difference between the heading of the unit and a selected heading.

9. A system as set forth in claim 8 which includes input means for providing course error signals to said course line means, and means for adjusting one end of said course line to different lateral positions to display the extent of the indicated course error.

10. A system as set forth in claim 8 which includes horizon line generator means for generating a horizon line, means for adjusting said horizon line to different attitudes with changes in pitch and roll attitude of said unit, and means in said course line means for electronically tying the end of the course line generated thereby to and for vertical displacement with said horizon line.

11. A system as set forth in claim 8 which includes heading line generator means for generating heading indications on the display, and in which said course line means is operative to adjust said one end of said further symbol to different ones of said heading indications.

12. A system as set forth in claim 8 which includes heading generator means for providing a heading scale on said display and in which said course line has one end adjusted on said scale to indicate the heading of the selected course, and in which said input means for said command signal generator includes means for at times providing yaw command signals to effect lateral adjustment of said command symbol on said display to the heading indicated by said line symbol.

13. A system as set forth in claim 8 which includes input means to said course line means for providing course error signals, and means in said course line means for effecting a changing skew to said line for changing course error signal inputs.

14. A system as set forth in claim 8 in which said input means includes means for providing roll command signals, and roll resolver means responsive to said roll command signals to rotate said command symbol on said display by an amount related to the roll command signal value, and separate means responsive to a signal indicating the actual roll attitude of the unit to rotate said further symbol provided by said course line means.

15. A system as set forth in claim 14 which includes an input circuit for providing actual roll attitude signals to said roll resolver means to maintain said command signal in its relative position with rotation of said further symbol by said separate means.

16. In a system for providing a display of command and attitude information on an integrated display for a mobile unit having motion about three axes, a command signal generator means for electronically generating a command symbol on a display tube indicating the desired attitude motion for the unit about such axes including a first input means for providing command signals which effect changes in the attitude of the command symbol on the display tube about its roll axis as necessary to command a desired degree of bank by the unit attitude about its roll axis, and a second generator means for electronically generating a horizon line on the same display tube which indicates the actual roll attitude of the unit, and means for electronically indexing different heading symbols along said horizon line on said display tube for changes of heading of the unit.

17. A system as set forth in claim 16 in which said last means includes means for electronically generating a numeric display of headings along the horizon line and which includes means for electronically generating a course line, the X coordinate on said horizon line for one end of the course line indexing the selected heading for the unit.

18. A system as set forth in claim 16 in which includes means for electronically generating a numeric display of actual unit heading on the display, and means for changing the range of numeric readouts with changes in the heading of the unit.

19. In a system having means for providing a video display of information for a mobile unit having motion about several axes, input means for providing signals which represent the actual heading of the unit, a first symbol generator means for providing a heading scale and for effecting an indication of the actual heading of the unit on said scale in a numeric presentation, second input means for providing signals indicating a selected course, and a second symbol generator means for providing an indication of the numeric value of the selected heading on said heading scale.

20. A system as set forth in claim 19 in which said first symbol generator means provides a ribbon scale with numeric values on said display, and a marker indicating the actual heading of the unit, and said second generator means includes means for adjusting an indicator to the position on said scale which represents the numeric value of the selected course.

21. A system as set forth in claim 19 which includes a fixed reference symbol and in which said first symbol generator means provides a horizon line and wherein said heading scale comprises a numeric scale on said horizon line, and said second symbol generator means provides a course line which with said fixed symbol represents the selected course, and which includes means for adjusting the far end of the course line along said scale to the numeric value for the selected course.

22. A system as set forth in claim 21 in which said second symbol generator means includes means for adjusting the near end of the course line to a position which is indicative of the value of VOR/LOC displacement signal.

23. In a system for providing a video display of information for a mobile unit having motion about several axes, means for electronically generating a heading scale on said display, means for electronically generating a course line on the display which is representative of a selected course and one end of which indicates the selected heading on said scale, and means for use with said course line to continually provide an indication of the unit position relative to the selected course.

24. In a system for providing a video display of information for a mobile unit having motion about several axes, course line generator means for electronically generating a course line on the display representative of the selected course, means for providing signals indicating proximity of the unit to a selected reference point on said course line, means for electronically generating a heading scale, and runway generator means for electronically generating a reference path responsive to said signals which move along said course line to display the relative distance to said point as the unit advances theretowards, the initial portion of said reference path being positioned on the scale adjacent the selected heading for the mobile unit.

25. In a system for providing horizontal situation, attitude and throttle command information on an integrated display for a mobile unit having motion about several axes, means for providing a horizon line symbol on said display, course line generator means for providing on said display an indication of the actual horizontal situation of the unit and including means for electronically generating a segmented course line on said display which extends from the horizon line to the bottom of the display, throttle command input means for providing signals indicating throttle command desired, and means for electronically providing motion to segments of said course line in a direction related to the throttle command signals.

26. A system as set forth in claim 1 which includes heading generator means for providing a heading scale along said horizon, input means for providing course error signals to said course line means, and means for positioning one end of said line symbol at different lateral positions on said horizon to display the extent of the indicated course error on said scale.

References Cited

UNITED STATES PATENTS

| | | | |
|---|---|---|---|
| 3,162,834 | 5/1961 | Schweighofer et al. | 340—27 |
| 3,307,191 | 2/1967 | Crane | 340—27 |
| 3,344,665 | 10/1967 | Anthony | 73—178 |
| 3,355,733 | 11/1967 | Mitchell et al. | 340—27 |

JOHN W. CALDWELL, Primary Examiner

H. COHEN, Assistant Examiner

U.S. Cl. X.R.

73—178; 178—6.8